(12) United States Patent
Nakashima et al.

(10) Patent No.: US 11,018,611 B2
(45) Date of Patent: May 25, 2021

(54) CONTROL APPARATUS FOR MULTI-PHASE ROTATING ELECTRIC MACHINE

(71) Applicant: DENSO CORPORATION, Kariya (JP)

(72) Inventors: Kotaro Nakashima, Kariya (JP); Nobuyori Nakajima, Kariya (JP); Takafumi Sato, Kariya (JP); Akira Takesaki, Kariya (JP); Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/941,343

(22) Filed: Mar. 30, 2018

(65) Prior Publication Data

US 2018/0287538 A1 Oct. 4, 2018

(30) Foreign Application Priority Data

Apr. 3, 2017 (JP) .............................. JP2017-073665

(51) Int. Cl.
*H02P 21/22* (2016.01)
*H02P 27/08* (2006.01)
(Continued)

(52) U.S. Cl.
CPC .............. *H02P 21/22* (2016.02); *B62D 5/046* (2013.01); *B62D 5/0463* (2013.01);
(Continued)

(58) Field of Classification Search
CPC ..... B62D 5/046; H02P 21/0003; H02P 27/08; H02P 29/027
See application file for complete search history.

(56) References Cited

U.S. PATENT DOCUMENTS 6,448,731 B1 * 9/2002 Miller .................... B62D 5/046
318/488
8,232,752 B2 * 7/2012 Kezobo .................. G01R 31/50
318/400.06
(Continued)

FOREIGN PATENT DOCUMENTS

JP H10-257788 A1 9/1998
JP 2002-084780 A1 3/2002
(Continued)

*Primary Examiner* — Said Bouziane
(74) *Attorney, Agent, or Firm* — Maschoff Brennan

(57) ABSTRACT

A control apparatus for a multi-phase rotating electric machine includes at least one electric power converter, a command value calculator and an input voltage determiner. The at least one electric power converter converts DC power into multi-phase AC power and supplies the multi-phase AC power to the rotating electric machine. The command value calculator calculates command values for operating the at least one electric power converter. The input voltage determiner determines whether an input voltage of the at least one electric power converter is within a normal operation range.

(Continued)

When the input voltage is determined by the input voltage determiner to be outside the normal operation range, the control apparatus switches control to ignore voltage change or current change caused by the reverse input of an external force to the rotating electric machine from a load side or suppress control fluctuation caused by the reverse input of the external force.

18 Claims, 19 Drawing Sheets

(51) Int. Cl.
 *H02P 21/00* (2016.01)
 *B62D 5/04* (2006.01)
 *H02P 29/024* (2016.01)
 *H02P 21/06* (2016.01)
(52) U.S. Cl.
 CPC ......... *B62D 5/0469* (2013.01); *B62D 5/0481* (2013.01); *H02P 21/0003* (2013.01); *H02P 21/06* (2013.01); *H02P 27/08* (2013.01); *H02P 29/027* (2013.01); *B62D 5/0412* (2013.01)

(56) References Cited

U.S. PATENT DOCUMENTS

| | | | |
|---|---|---|---|
| 2006/0071628 A1* | 4/2006 | Ta | B62D 5/046 318/807 |
| 2006/0145649 A1* | 7/2006 | Iura | H02P 23/06 318/727 |
| 2008/0074063 A1* | 3/2008 | Fulton | H02P 5/68 318/98 |
| 2010/0201294 A1* | 8/2010 | Yuuki | B60L 15/025 318/400.3 |
| 2011/0024224 A1* | 2/2011 | Mori | B62D 5/0469 180/446 |
| 2013/0241463 A1* | 9/2013 | Bando | H02P 9/007 318/810 |
| 2014/0207337 A1 | 7/2014 | Tamaizumi | |
| 2015/0207438 A1* | 7/2015 | Takami | H02P 6/28 318/400.06 |

FOREIGN PATENT DOCUMENTS

| | | |
|---|---|---|
| JP | 2011-031713 A | 2/2011 |
| JP | 2016-167971 A | 9/2016 |
| JP | 2018-057210 | 4/2018 |

\* cited by examiner

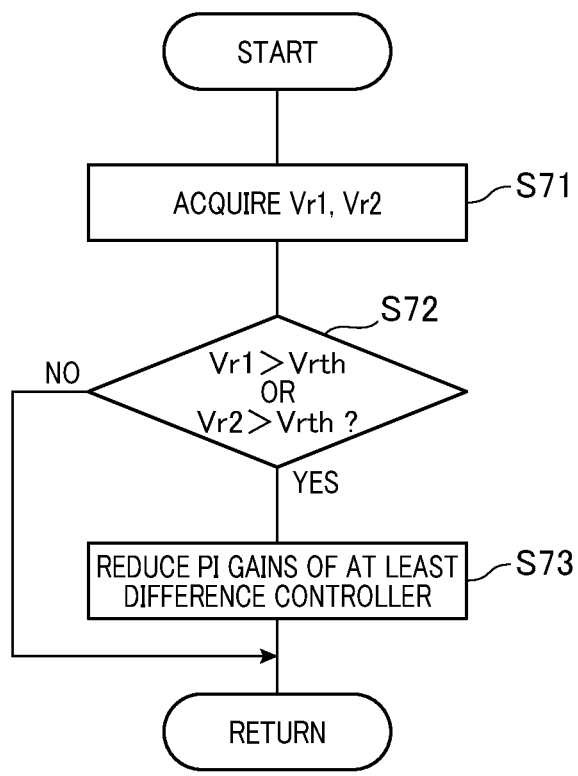

CONTROL APPARATUS FOR MULTI-PHASE ROTATING ELECTRIC MACHINE

CROSS-REFERENCE TO RELATED APPLICATION

This application is based on and claims priority from Japanese Patent Application No. 2017-73665 filed on Apr. 3, 2017, the content of which is hereby incorporated by reference in its entirety into this application.

BACKGROUND

1 Technical Field

The present invention relates to control apparatuses for multi-phase rotating electric machines.

2 Description of Related Art

In a motor that outputs steering assist torque in an electric power steering apparatus of a vehicle, when a wheel of the vehicle runs onto a curb during traveling of the vehicle, an external force may be inputted reversely to an output shaft of the motor via a rack. In such a case, specific control may be performed according to known techniques.

For example, there is disclosed an electric power steering apparatus in Japanese Patent Application Publication No. JP2011031713A. According to the disclosure, the electric power steering apparatus determines, based on the rotation angular speed and rotation angular acceleration of the motor, whether an external force greater than or equal to a predetermined value is inputted reversely to the motor. Moreover, when it is determined that an external force greater than or equal to the predetermined value is inputted reversely to the motor, the electric power steering apparatus reduces the rotation angular speed of the motor through field-strengthening control, thereby suppressing an impulsive force transmitted to a torque transmitting member.

However, adverse effects caused by the reverse input of an external force to the motor may include, in addition to the mechanical impulsive force, the application of a counter-electromotive force to an inverter and thus increase in phase currents supplied from the inverter to the motor.

Moreover, in the case of determining a short-circuit fault of switching elements or electric current paths of the inverter based on the phase currents, when the phase currents are increased due to the reverse input of an external force to the motor, it may be erroneously determined that an overcurrent abnormality has occurred although no short-circuit fault has actually occurred. Furthermore, the responsiveness of current feedback control may become unstable due to the reverse input of an external force to the motor. However, such adverse effects on various controls due to the reverse input of an external force to the motor are not mentioned in the above patent document.

SUMMARY

According to exemplary embodiments, there is provided a control apparatus that controls the drive of a multi-phase rotating electric machine. The rotating electric machine is configured to output torque to a load during normal operation of the rotating electric machine. Moreover, operation of the rotating electric machine when an external force is inputted reversely to the rotating electric machine from the load side is defined as being not normal. The control apparatus includes at least one electric power converter, a command value calculator and an input voltage determiner. The at least one electric power converter is configured to convert, through operation of a plurality of switching elements, DC power into multi-phase AC power and supply the multi-phase AC power to the rotating electric machine. The command value calculator calculates command values for operating the at least one electric power converter and thereby controlling energization of the rotating electric machine. The input voltage determiner determines whether an input voltage of the at least one electric power converter is within a normal operation range. The input voltage is a voltage between a high-potential line and a low-potential line of the at least one electric power converter. The normal operation range is a range of the input voltage during normal operation of the rotating electric machine. The control apparatus is configured to switch control, when the input voltage is determined by the input voltage determiner to be outside the normal operation range, to ignore voltage change or current change caused by the reverse input of an external force to the rotating electric machine from the load side or to suppress control fluctuation caused by the reverse input of the external force.

As described previously, Japanese Patent Application Publication No. JP2011031713A discloses that when an external force is inputted reversely to the motor, field-strengthening control is performed to reduce the rotation angular speed of the motor. However, this patent document fails to focus attention on voltage change or current change and control fluctuation caused by the reverse input of an external force.

In contrast, the control apparatus according to the exemplary embodiments is configured to shift control, when the input voltage is determined by the input voltage determiner to be outside the normal operation range, to ignore voltage change or current change caused by the reverse input of an external force to the rotating electric machine from the load side or to suppress control fluctuation caused by the reverse input of the external force.

With the above configuration, when an external force is inputted reversely to the rotating electric machine from the load side, it is possible to suitably suppress adverse effects on various controls due to the reverse input of the external force.

In one exemplary embodiment, the control apparatus further includes an abnormality determiner that performs an overcurrent abnormality determination according to whether phase currents flowing in the at least one electric power converter or the rotating electric machine exceed a current threshold. Moreover, when the input voltage is determined by the input voltage determiner to be outside the normal operation range, the abnormality determiner discontinues the overcurrent abnormality determination.

With the above configuration, when the phase currents are temporarily increased due to a counterelectromotive force that is generated by the reverse input of an external force to the rotating electric machine, the abnormality determiner is prevented from erroneously determining that an overcurrent abnormality has occurred although no short-circuit fault has actually occurred.

BRIEF DESCRIPTION OF THE DRAWINGS

The present invention will be understood more fully from the detailed description given hereinafter and from the accompanying drawings of exemplary embodiments, which, however, should not be taken to limit the present invention In the accompanying drawings:

FIG. 19 is a flowchart illustrating a process of the control apparatus according to the seventh embodiment for switching control when an input voltage is excessive.

DESCRIPTION OF EMBODIMENTS

Figure 1:
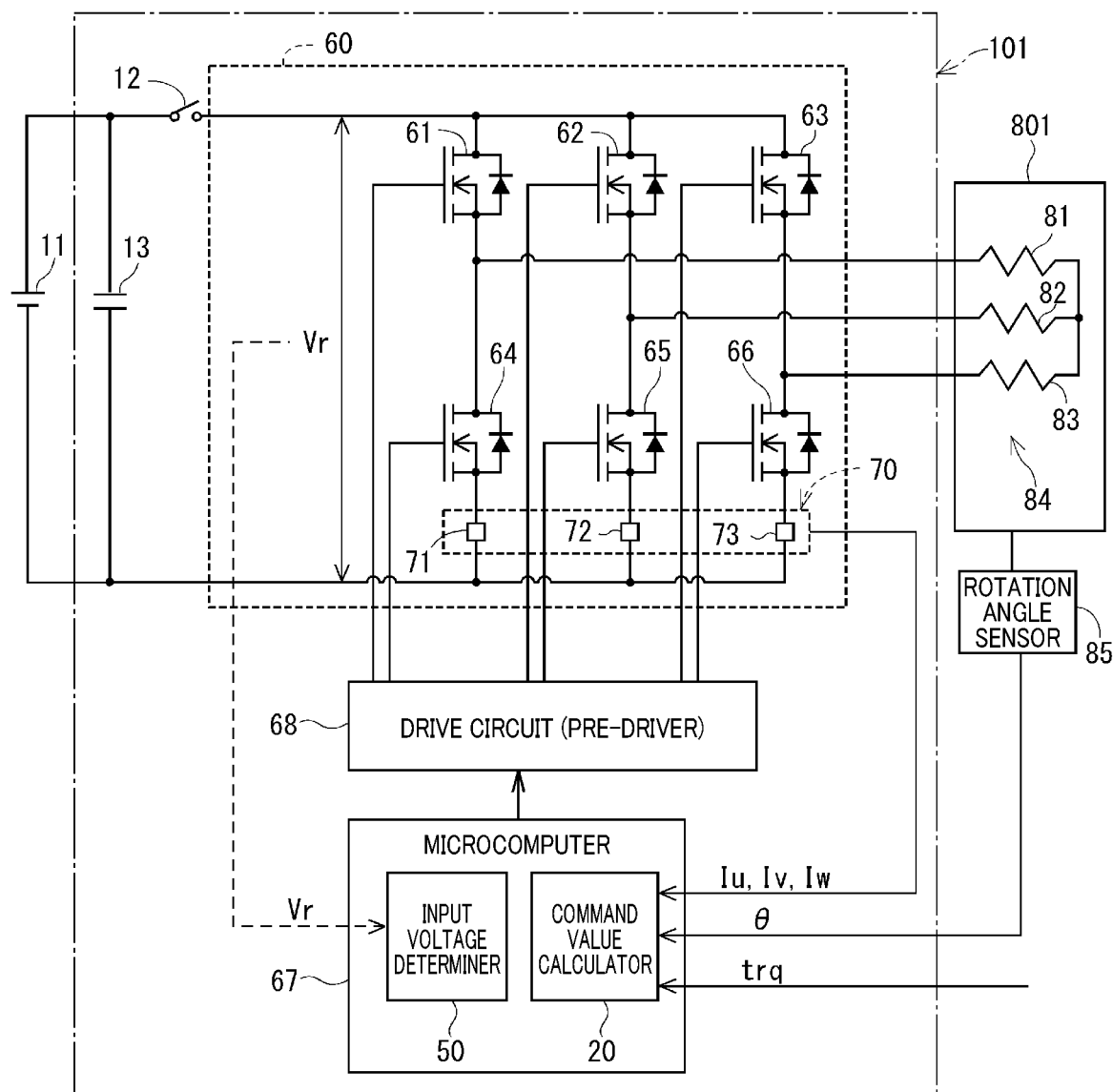
FIG. 1 is an overall configuration diagram of one-system control apparatuses, according to first to sixth embodiments, for a three-phase rotating electric machine that includes a single three-phase coil set.

Exemplary embodiments will be described hereinafter with reference to FIGS. 1-19.

It should be noted that for the sake of clarity and understanding, identical components having identical functions throughout the whole description have been marked, where possible, with the same reference numerals in each of the figures and that for the sake of avoiding redundancy, descriptions of identical components will not be repeated.

In each of the embodiments, a control apparatus is configured to control a three-phase rotating electric machine. Moreover, the three-phase rotating electric machine is employed as a steering assist motor in an electric power steering apparatus of a vehicle.

First, the overall configuration of an electric power steering apparatus and the overall configuration of a control apparatus, which are common to all of the embodiments, will be described.

[Configuration of Electric Power Steering Apparatus]

Figure 2:
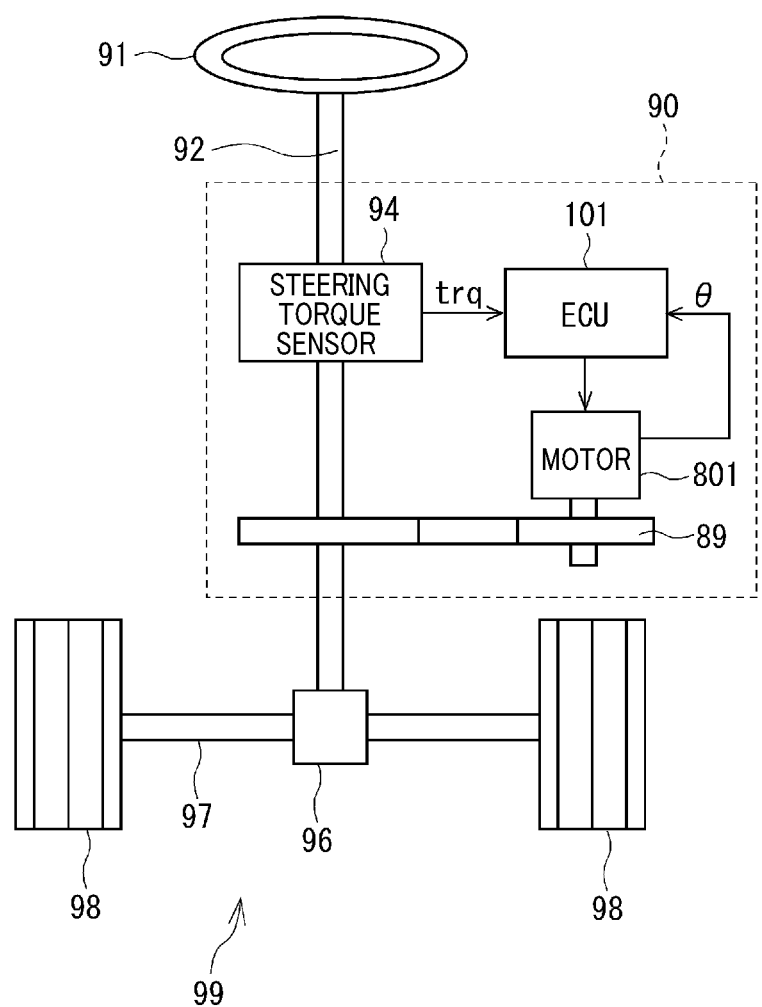
FIG. 2 is an overall configuration diagram of an electric power steering apparatus to which the control apparatuses according to the embodiments are applied.

FIG. 2 shows the overall configuration of a steering system 99 which includes an electric power steering apparatus 90.

The electric power steering apparatus 90 is configured as a column assist electric power steering apparatus. It should be appreciated that the electric power steering apparatus 90 may alternatively be configured as a rack assist electric power steering apparatus.

As shown in FIG. 2, the steering system 99 includes a steering wheel 91, a steering shaft 92, a steering torque sensor 94, a pinion 96, a rack 97 and a pair of wheels 98 in addition to the electric power steering apparatus 90.

The steering wheel 91 is fixed to the top of the steering shaft 92. At the bottom of the steering shaft 92, there is provided the pinion 96 which is in mesh with the rack 97. To both ends of the rack 97, there are rotatably connected the wheels 98 via tie rods and the like. When the steering wheel 91 is turned by a driver, the steering shaft 92 rotates. The rotational motion of the steering shaft 92 is then converted by the pinion 96 into a linear motion of the rack 97. Consequently, the wheels 98 are steered by an angle that depends on the amount of linear displacement of the rack 97.

The steering torque sensor 94 is mounted to a portion of the steering shaft 92 between the top and the bottom of the same. The steering torque sensor 94 is configured to detect (or sense) steering torque trq applied by the driver and output the detected steering torque trq to the electric power steering apparatus 90.

The electric power steering apparatus 90 includes an ECU (Electronic Control Unit) 101, a three-phase brushless motor 801, speed reduction gears 89 and the like. In addition, the reference numerals (i.e., 101 and 801) respectively designating the ECU and the motor in FIG. 2 are the same as those respectively designating the ECU and the motor in FIG. 1.

The ECU 101 controls, based on the detected steering torque trq, the drive of the motor 801 so as to cause the motor 801 to generate desired steering assist torque. The steering assist torque generated by the motor 801 is then transmitted to the steering shaft 92 via the speed reduction gears 89.

In addition, when at least one of the wheels 98 runs onto a curb during traveling of the vehicle, the wheels 98 may be rapidly steered and an external force may be inputted reversely to the motor 801 from the loads such as the rack 97.

[Configuration of ECU]

FIG. 1 shows the overall configuration of the ECU 101.

The motor 801 includes a three-phase coil set 84 that is comprised of a U-phase coil 81, a V-phase coil 82 and a W-phase coil 83.

The ECU 101 includes an inverter 60 as an electric power converter, a current sensor 70, a microcomputer 67 and a drive circuit (or pre-driver) 68.

Figure 17:
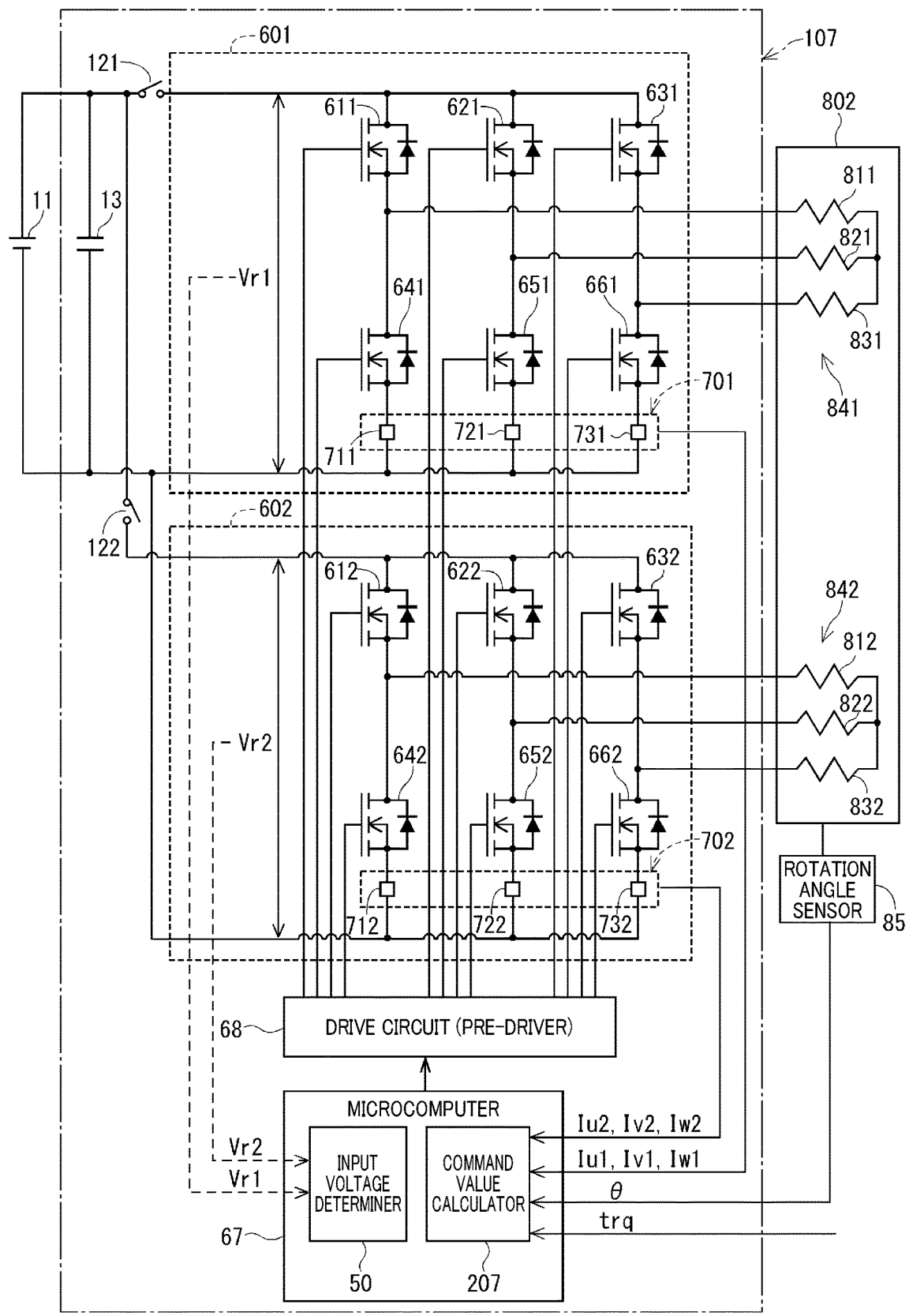
FIG. 17 is an overall configuration diagram of a two-system control apparatus, according to a seventh embodiment, for a three-phase rotating electric machine that includes two three-phase coil sets.

Here, the unit of the three-phase coil set 84 of the motor 801, the inverter 60 for energizing the three-phase coil set 84 and a group of elements for controlling the energization of the three-phase coil set 84 is defined as "system". In each of the first to the sixth embodiments, the ECU 101 is a one-system control apparatus for controlling (or driving) the motor 801 that includes the single three-phase coil set 84. On the other hand, as shown in FIG. 17, an ECU 107 according to the seventh embodiment is a two-system control apparatus for controlling (or driving) a three-phase brushless motor 802 that includes two three-phase coil sets 841 and 842.

The inverter 60 converts, through operation of six switching elements 61-66, DC power from a battery 11 into three-phase AC power and supplies the resultant three-phase AC power to the three-phase coil set 84.

Each of the switching elements 61-66 is implemented by, for example, a MOSFET (Metal-Oxide-Semiconductor Field-Effect Transistor). Moreover, the switching elements 61-66 are bridge-connected. More specifically, the switching elements 61, 62 and 63 are respectively the U-phase, V-phase and W-phase upper-arm switching elements; the switching elements 64, 65 and 66 are respectively the U-phase, V-phase and W-phase lower-arm switching elements.

On the input side (or upstream side) of the inverter 60, there are provided a power-source relay 12 and a smoothing capacitor 13. Hereinafter, the voltage between a high-potential line and a low-potential line of the inverter 60, i.e., the voltage across the smoothing capacitor 13 will be referred to as "input voltage Vr". The input voltage Vr is detected by, for example, a voltage sensor (not shown).

The microcomputer 67 includes a command value calculator 20 and an input voltage determiner 50.

The command value calculator 20 calculates command values for operating the inverter 60 and thereby controlling the energization of the motor 801.

The input voltage determiner 50 determines whether the input voltage Vr is within a normal operation range. Here, the "normal operation range" denotes the range of the input voltage Vr during normal operation of the motor 801. Moreover, the expression "when the input voltage Vr is excessive" used hereinafter denotes "when the input voltage Vr is determined by the input voltage determiner 50 to be outside the normal operation range".

More specifically. "normal operation" of the motor 801 denotes the power running operation of the motor 801 relying on only the electric power supplied from the inverter 60 without any external force inputted reversely to the motor 801 from the load side. In other words, the motor 801 does not operate normally when an external force is inputted reversely to the motor 801.

Moreover, the meaning of the phrase "the motor 801 does not operate normally" is different from malfunction of the motor 801 and the inverter 60. That is, when both the motor 801 and the inverter 60 are in a normal state (or in a state of being capable of functioning normally), operation of the motor 801 with the reverse input of an external force is defined as being not normal.

In addition, when the input voltage Vr remains within the normal operation range even with the reverse input of an external force to the motor 801, normal control (or control performed during normal operation of the motor 801) is maintained.

The current sensor 70 includes current sensing elements 71, 72 and 73 for respectively detecting U-phase, V-phase and W-phase currents Iu, Iv and Iw supplied to the U-phase, V-phase and W-phase coils 81, 82 and 83 of the motor 801. The current sensor 70 feedbacks the detected phase currents Iu, Iv and Iw to the command value calculator 20 of the microcomputer 67.

A rotation angle sensor 85 is provided to detect an electrical angle $\theta$ of the motor 801 which represents the rotation angle of the motor 801. The rotation angle sensor 85 outputs the detected electrical angle $\theta$ to the command value calculator 20 of the microcomputer 67.

The command value calculator 20 calculates the command values based on information including the detected steering torque trq, the detected phase currents Iu, Iv and Iw, and the detected electrical angle $\theta$ of the motor 801. Then, the energization of the motor 801 is controlled through operation of the inverter 60 in accordance with the command values calculated by the command value calculator 20.

In addition, the details of the command value calculator 20 vary between each embodiment. Therefore, in each of the embodiments described below, the command value calculator is designated by a three-digit reference numeral the first two digits of which are "20" and the last digit is the number of the embodiment. For example, in the first embodiment, the command value calculator is designated by 201.

When at least one of the wheels 98 runs onto a curb during traveling of the vehicle and thus an external force is inputted reversely to the motor 801 from the load side, the input voltage Vr of the inverter 60 is increased due to the generation of a counterelectromotive force. Consequently, the phase currents Iu, Iv and Iw supplied from the inverter 60 to the motor 801 are increased. In particular, when the wheels 98 are rapidly steered during high-speed traveling of the vehicle, the input voltage Vr of the inverter 60 may become considerably higher than the normal operation range, thereby affecting determining processes performed during normal operation of the motor 801 and resulting in control fluctuation.

As described previously, Japanese Patent Application Publication No. JP2011031713A discloses that when an external force is inputted reversely to the motor, field-strengthening control is performed to reduce the rotation angular speed of the motor. However, this patent document fails to mention the adverse effect of the reverse input of an external force to the motor on an abnormality determining process and how to suppress control fluctuation caused by the reverse input of an external force to the motor.

In contrast, in the embodiments described below, the ECU 101 is configured to suppress the adverse effects on various controls caused by the reverse input of an external force to the motor.

First Embodiment

Figure 3:
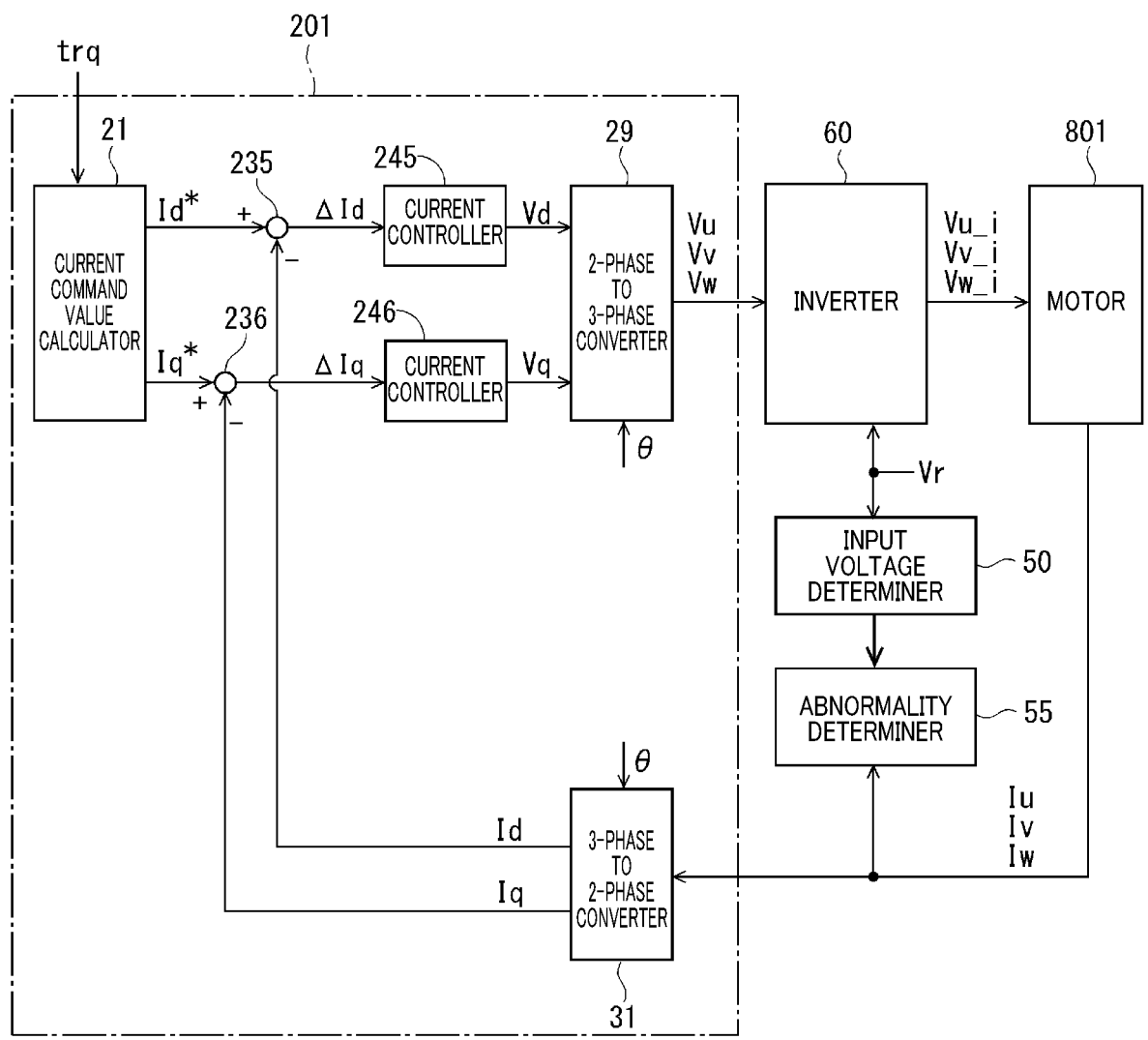
FIG. 3 is a control block diagram of the control apparatus according to the first embodiment.

As shown in FIG. 3, in the first embodiment, the microcomputer 67 includes an abnormality determiner 55 in addition to the command value calculator 201 and the input voltage determiner 50.

In addition, in FIG. 3, for the sake of simplicity, the output of U-phase, V-phase and W-phase voltage command values Vu, Vv and Vw from the command value calculator 201 to the inverter 60 is illustrated with only a single arrow line. The output of U-phase, V-phase and W-phase voltages Vu_i, Vv_i and Vw_i from the inverter 60 to the motor 801 is also illustrated with only a single arrow line. The input of the detected electrical angle $\theta$ of the motor 801 to the command value calculator 201 is illustrated with only two arrows omitting signal lines from the rotation angle sensor 85.

In the first embodiment, the command value calculator 201 is configured to perform current feedback control by vector control. Specifically, the command value calculator 201 includes a current command value calculator 21, current deviation calculators 235 and 236, current controllers 245 and 246, a 2-phase to 3-phase converter 29 and a 3-phase to 2-phase converter 31.

In addition, those elements of the command value calculator 201 which are each designated by a three-digit reference numeral whose last digit is "5" relate to d-axis current or d-axis voltage. On the other hand, those elements of the command value calculator 201 which are each designated by a three-digit reference numeral whose last digit is "6" relate to q-axis current or q-axis voltage.

The current command value calculator 21 calculates both a d-axis current command value Id* and a q-axis current command value Iq* based on the detected steering torque trq and the like. In addition, in the second to the fifth embodiments, for the sake of simplicity, the current command value calculator 21 is not shown in the figures corresponding to FIG. 3.

The 3-phase to 2-phase converter 31 converts, using the electrical angle θ detected by the rotation angle sensor 85, the U-phase, V-phase and W-phase currents Iu, Iv and Iw detected by the current sensor 70 into d-axis and q-axis feedback currents Id and Iq. Then, the 3-phase to 2-phase converter 31 outputs the resultant d-axis and q-axis feedback currents Id and Iq respectively to the current deviation calculators 235 and 236.

The current deviation calculator 235 calculates the d-axis current deviation ΔId between the d-axis current command value Id* and the d-axis feedback current Id. Similarly, the current deviation calculator 236 calculates the q-axis current deviation ΔIq between the q-axis current command value Iq* and the q-axis feedback current Iq.

The current controller 245 calculates a d-axis voltage command value Vd by PI (Proportional Integral) control so as to make the d-axis current deviation ΔId approach 0 (zero). Similarly, the current controller 246 calculates a q-axis voltage command value Vq by PI control so as to make the q-axis current deviation ΔIq approach 0.

The 2-phase to 3-phase converter 29 converts, using the electrical angle θ detected by the rotation angle sensor 85, the d-axis and q-axis voltage command values Vd and Vq into the U-phase, V-phase and W-phase voltage command values Vu, Vv and Vw. Then, the 2-phase to 3-phase converter 29 outputs the resultant U-phase, V-phase and W-phase voltage command values Vu, Vv and Vw to the inverter 60.

The inverter 60 converts, through operation of the switching elements 61-66 according to PWM (Pulse Width Modulation) signals, the DC power from the battery 11 into three-phase AC power; the PWM signals are generated based on the U-phase, V-phase and W-phase voltage command values Vu, Vv and Vw. Then, the inverter 60 applies the U-phase, V-phase and W-phase voltages Vu_i, Vv_i and Vw_i of the resultant three-phase AC power respectively to the U-phase, V-phase and W-phase coils 81, 82 and 83 of the motor 801.

The abnormality determiner 55 determines that an overcurrent abnormality has occurred when the phase currents Iu, Iv and Iw flowing in the inverter 60 or the phase coils 81, 82 and 83 of the motor 801 exceed a current threshold Ith. More specifically, the abnormality determiner 55 determines the occurrence of an overcurrent abnormality when the absolute values of the phase currents Iu, Iv and Iw exceed the current threshold Ith. Alternatively, the abnormality determiner 55 may determine the occurrence of an overcurrent abnormality when the phase currents Iu, Iv and Iw changing in the form of a sine wave become higher than a positive current threshold or lower than a negative current threshold.

When a short-circuit fault of the switching elements 61-66 or electric current paths of the inverter 60 occurs or a power-supply-short fault or a ground-short fault of the coils 81-83 of the motor 801 occurs during normal operation of the motor 801, it is determined by the abnormality determiner 55 that an overcurrent abnormality has occurred. Then, the command value calculator 201 stops the drive of the inverter 60, thereby realizing a fail-safe. Moreover, the ECU 101 sends, via an in-vehicle LAN, abnormality information to a vehicle ECU, thereby causing the vehicle ECU to take countermeasures against the overcurrent abnormality, such as warning the driver of the occurrence of the overcurrent abnormality.

On the other hand, when the phase currents Iu, Iv and Iw are temporarily increased due to a counterelectromotive force that is generated by the reverse input of an external force to the motor 801, the abnormality determiner 55 may erroneously determine that an overcurrent abnormality has occurred although no short-circuit fault has actually occurred. Consequently, the drive of the inverter 60 would be stopped, disabling the steering assist function of the electric power steering apparatus 90. Moreover, a false warning may be issued, thereby causing unnecessary anxiety to the driver.

In view of the above, in the first embodiment, when the input voltage Vr is excessive, the input voltage determiner 50 commands the abnormality determiner 55 to discontinue the overcurrent abnormality determination.

Figure 4:
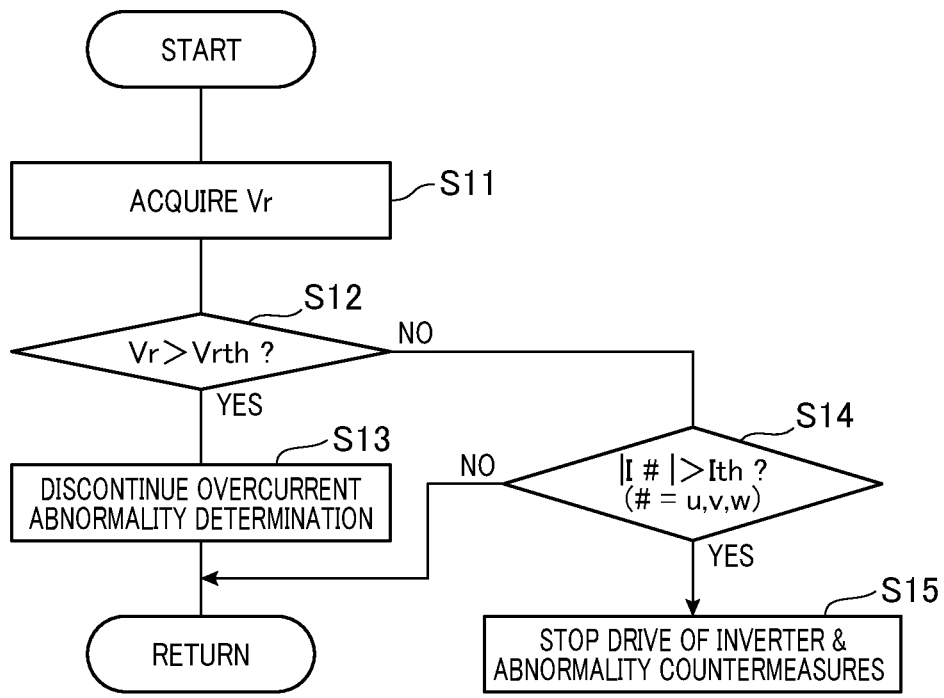
FIG. 4 is a flowchart illustrating a process of the control apparatus according to the first embodiment for switching control when an input voltage is excessive.

FIG. 4 shows a process performed by the ECU 101 according to the present embodiment for switching control according to the determination result of the input voltage determiner 50. In addition, this process is repeatedly performed during operation of the ECU 101.

First, at step S11, the input voltage determiner 50 acquires the input voltage Vr.

At step S12, the input voltage determiner 50 determines whether the input voltage Vr is higher than a voltage threshold Vrth. Here, the voltage threshold Vrth is set to an upper limit of the normal operation range.

If the input voltage Vr is not higher than the voltage threshold Vrth and thus the determination at step S12 results in a "NO" answer, the process proceeds to step S14.

At step S14, the abnormality determiner 55 determines whether the absolute value |I#| of each phase current I# is higher than the current threshold Ith. Here, "#" represents any of u, v and w.

If the determination at step S14 results in a "YES" answer, there is a possibility that a short-circuit fault of the switching elements 61-66 or electric current paths of the inverter 60 has occurred or a power-supply-short fault or a ground-short fault of the coils 81-83 of the motor 801 has occurred. Therefore, in this case, the process proceeds to step S15, at which the ECU 101 stops the drive of the inverter 60 and takes countermeasures against the overcurrent abnormality such as interrupting (or opening) the power-source relay 12 and warning the driver of the occurrence of the overcurrent abnormality.

In contrast, if the determination at step S14 results in a "NO" answer, the operation of the motor 801 can be considered to be normal. Therefore, in this case, the process is directly terminated.

On the other hand, if the input voltage Vr is higher than the voltage threshold Vrth and thus the determination at step S12 results in a "YES" answer, the process proceeds to step S13.

At step S13, the input voltage determiner 50 commands the abnormality determiner 55 to discontinue the overcurrent abnormality determination. Consequently, the steering assist function of the electric power steering apparatus 90 is prevented from being disabled due to an erroneous determination; and the driver is prevented from receiving a false warning.

According to the present embodiment, it is possible to achieve the following advantageous effects.

In the present embodiment, the electric power steering apparatus 90 includes the three-phase brushless motor 801 that outputs steering assist torque and the ECU 101 that controls the drive of the motor 801. The operation of the motor 801 when an external force is inputted reversely to the motor 801 from the side of the loads such as the rack 97 is defined as being not normal. The ECU 101 includes the inverter 60, the command value calculator 201 and the input voltage determiner 50. The inverter 60 is configured to convert, through operation of the switching elements 61-66, DC power from the battery 11 into three-phase AC power and supply the resultant three-phase AC power to the motor 801. The command value calculator 201 calculates the command values (e.g., the d-axis and q-axis current command values Id* and Iq*) for operating the inverter 60 and thereby controlling energization of the motor 801. The input voltage determiner 50 determines whether the input voltage Vr is within the normal operation range. The input voltage Vr is the voltage between the high-potential and low-potential lines of the inverter 60. The normal operation range is the range of the input voltage Vr during normal operation of the motor 801. The ECU 101 is configured to switch control (see step S12 of FIG. 4), when the input voltage Vr is determined by the input voltage determiner 50 to be outside the normal operation range, to ignore change in the phase currents Iu, Iv, Iw caused by the reverse input of an external force to the motor 801 from the load side.

With the above configuration, when an external force is inputted reversely to the motor 801 from the load side, it is possible to suitably suppress adverse effects on various controls due to the reverse input of the external force.

More particularly, in the present embodiment, the ECU 101 includes the abnormality determiner 55 that performs the overcurrent abnormality determination according to whether the phase currents Iu, Iv and Iw flowing in the inverter 60 or the phase coils 81, 82 and 83 of the motor 801 exceed the current threshold Ith (see step S14 of FIG. 4). Moreover, when the input voltage Vr is determined by the input voltage determiner 50 to be outside the normal operation range, the abnormality determiner 55 discontinues the overcurrent abnormality determination (see step S13 of FIG. 4).

With the above configuration, when the phase currents Iu, Iv and Iw are temporarily increased due to a counterelectromotive force that is generated by the reverse input of an external force to the motor 801, the abnormality determiner 55 is prevented from erroneously determining that an overcurrent abnormality has occurred although no short-circuit fault has actually occurred.

Second Embodiment

Figure 5:
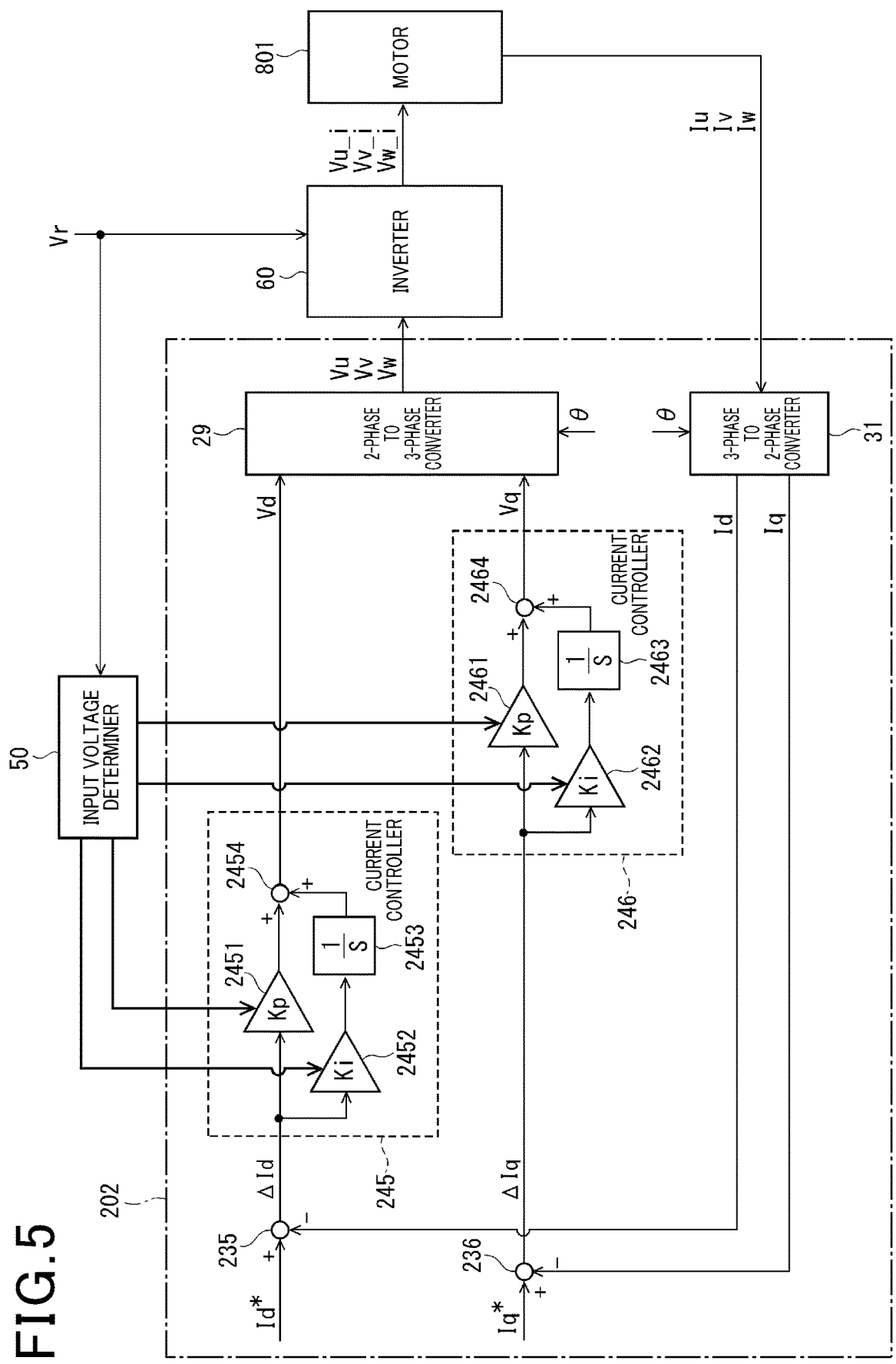
FIG. 5 is a control block diagram of the control apparatus according to the second embodiment.

FIG. 5 shows the detailed configuration of the d-axis and q-axis current controllers 245 and 246 of the command value calculator 202 according to the second embodiment.

In the present embodiment, the d-axis current controller 245 includes a proportional gain multiplier 2451, an integral gain multiplier 2452, an integrator 2453 and an adder 2454. The proportional gain multiplier 2451 calculates a proportional term by multiplying the d-axis current deviation ΔId by a proportional gain Kp. The integral gain multiplier 2452 multiplies the d-axis current deviation ΔId by an integral gain Ki. The integrator 2453 calculates an integral term by integrating the result of the multiplication performed by the integral gain multiplier 2452. The adder 2454 adds the proportional term and the integral term together.

Similarly, the q-axis current controller 246 includes a proportional gain multiplier 2461, an integral gain multiplier 2462, an integrator 2463 and an adder 2464. The proportional gain multiplier 2461 calculates a proportional term by multiplying the q-axis current deviation ΔIq by the proportional gain Kp. The integral gain multiplier 2462 multiplies the q-axis current deviation ΔIq by the integral gain Ki. The integrator 2463 calculates an integral term by integrating the result of the multiplication performed by the integral gain multiplier 2462. The adder 2464 adds the proportional term and the integral term together.

Hereinafter, the proportional gain Kp and the integral gain Ki will be together referred to as "PI gains".

In the present embodiment, when the input voltage Vr is excessive, the input voltage determiner 50 commands the proportional gain multipliers 2451 and 2461 and integral gain multipliers 2452 and 2462 of the d-axis and q-axis current controllers 245 and 246 to reduce the PI gains to become less than during normal operation of the motor 801.

Figure 6:
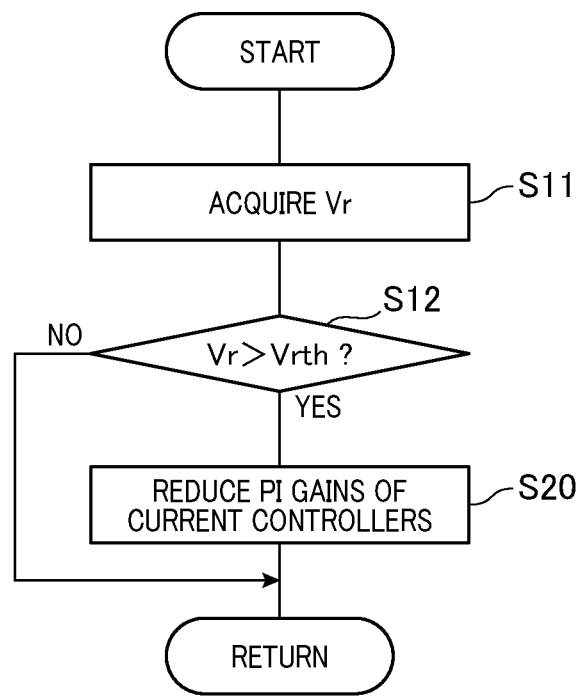
FIG. 6 is a flowchart illustrating a process of the control apparatus according to the second embodiment for switching control when an input voltage is excessive.

FIG. 6 shows a process performed by the ECU 101 according to the present embodiment for switching control according to the determination result of the input voltage determiner 50. In addition, this process is repeatedly performed during operation of the ECU 101.

As shown in FIG. 6, in the present embodiment, if the input voltage Vr is not higher than the voltage threshold Vrth and thus the determination at step S12 results in a "NO" answer, the process is directly terminated.

On the other hand, if the input voltage Vr is higher than the voltage threshold Vrth and thus the determination at step S12 results in a "YES" answer, the process proceeds to step S20.

At step S20, the command value calculator 202 reduces the PI gains of the current controllers 245 and 246. Consequently, the responsiveness of the current feedback control performed by the command value calculator 202 is lowered, thereby suppressing control fluctuation caused by the reverse input of an external force to the motor 801 from the load side.

In addition, steps S11 and S12 in FIG. 6 are identical to those in FIG. 4 described in the first embodiment. Therefore, for the sake of avoiding redundancy, the explanation of steps S11 and S12 is not repeated in the present embodiment.

According to the present embodiment, it is possible to achieve the following advantageous effects.

In the present embodiment, the ECU 101 is configured to switch control (see step S12 of FIG. 6), when the input voltage Vr is determined by the input voltage determiner 50 to be outside the normal operation range, to suppress control fluctuation caused by the reverse input of an external force to the motor 801 from the load side.

With the above configuration, when an external force is inputted reversely to the motor 801 from the load side, it is possible to suitably suppress adverse effects on various controls due to the reverse input of the external force.

More particularly, in the present embodiment, when the input voltage Vr is determined by the input voltage determiner 50 to be outside the normal operation range, the command value calculator 202 lowers the responsiveness of the current feedback control to become lower than during normal operation of the motor 801.

With the above configuration, it is possible to reliably suppress control fluctuation caused by the reverse input of an external force to the motor 801 from the load side.

Still more particularly, in the present embodiment, the command value calculator 202 includes the d-axis and q-axis current controllers 245 and 246. The d-axis current controller 245 calculates the d-axis voltage command value Vd by PI control so as to make the d-axis current deviation ΔId approach 0. The q-axis current controller 246 calculates the q-axis voltage command value Vq by PI control so as to make the q-axis current deviation ΔIq approach 0. Moreover, when the input voltage Vr is determined by the input voltage determiner 50 to be outside the normal operation range, the command value calculator 202 reduces the PI gains of the current controllers 245 and 246 to become less than during normal operation of the motor 801 (see step S20 of FIG. 6).

With the above configuration, it is possible for the command value calculator 202 to reliably lower the responsiveness of the current feedback control to become lower than during normal operation of the motor 801.

Third Embodiment

Figure 7:
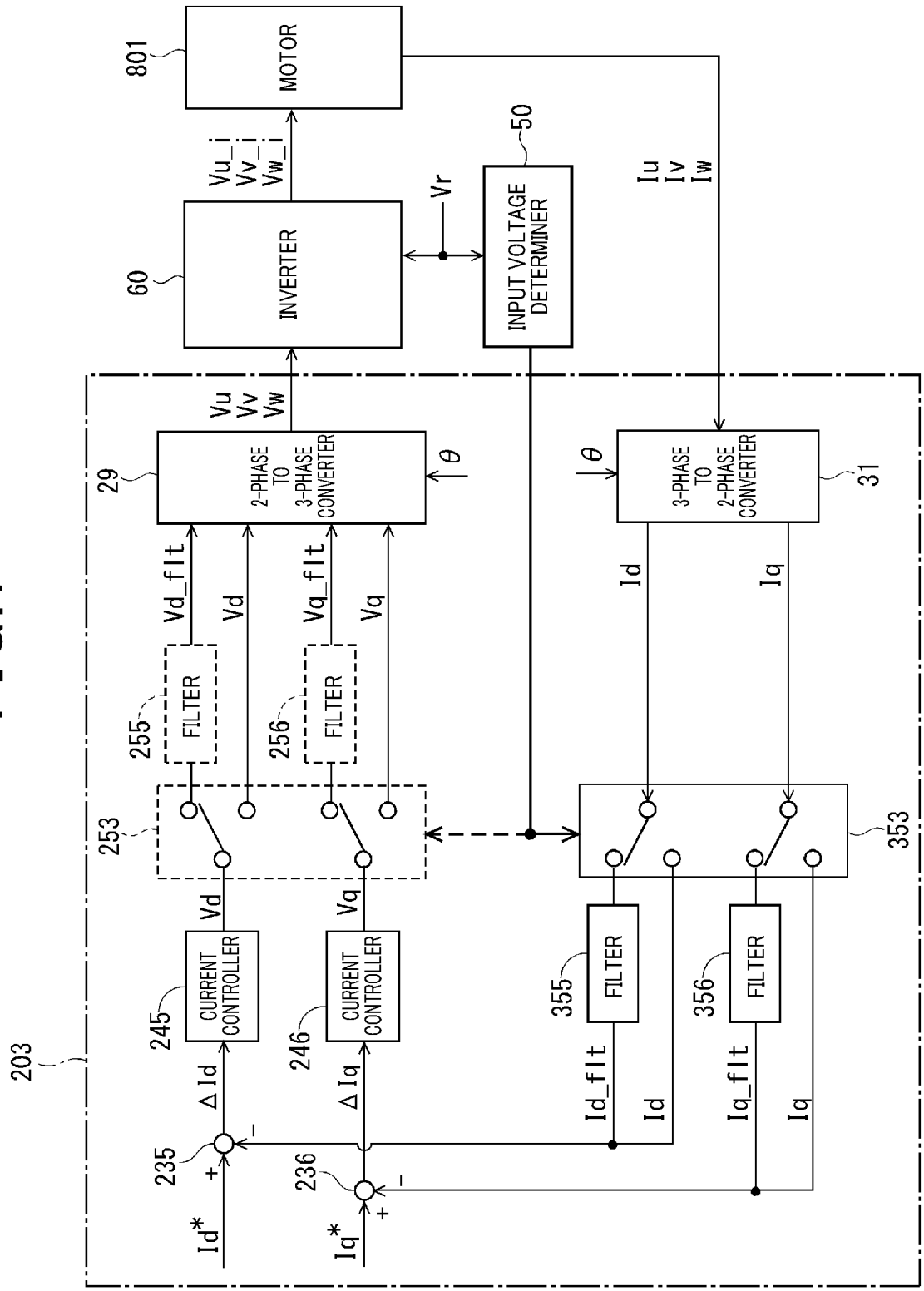
FIG. 7 is a control block diagram of the control apparatus according to the third embodiment.

As shown in FIG. 7, the command value calculator 203 according to the third embodiment has a switch unit 353 and a pair of filters 355 and 356 provided in the feedback current paths and a switch unit 253 and a pair of filters 255 and 256 provided in the voltage command paths.

It should be noted that the command value calculator 203 may alternatively have only one of the set of the switch unit 353 and the filters 355 and 356 which is shown with continuous lines in FIG. 7 and the set of the switch unit 253 and the filters 255 and 256 which is shown with dashed lines in FIG. 7.

The switch unit 353 is configured to switch the d-axis feedback current Id between a path passing through the filter 355 and a path bypassing the filter 355 and the q-axis feedback current Iq between a path passing through the filter 356 and a path bypassing the filter 356. Each of the filters 355 and 356 is implemented by a primary delay filter that outputs a filter value whose phase is delayed according to the frequency of the input. Specifically, the filter 355 outputs a d-axis current filter value Id_flt while the filter 356 outputs a q-axis current filter value Iq_flt.

Similarly, the switch unit 253 is configured to switch the d-axis voltage command value Vd between a path passing through the filter 255 and a path bypassing the filter 255 and the q-axis voltage command value Vq between a path passing through the filter 256 and a path bypassing the filter 256. Each of the filters 255 and 256 is implemented by a primary delay filter that outputs a filter value whose phase is delayed according to the frequency of the input. Specifically, the filter 255 outputs a d-axis voltage command filter value Vd_flt while the filter 256 outputs a q-axis voltage command filter value Vq_flt.

During normal operation of the motor 801, the switch unit 353 is placed in a state of allowing the d-axis and q-axis feedback currents Id and Iq to flow respectively bypassing the filters 355 and 356. Similarly, the switch unit 253 is placed in a state of allowing the d-axis and q-axis voltage command values Vd and Vq to be outputted respectively bypassing the filters 255 and 256.

On the other hand, when the input voltage Vr is determined by the input voltage determiner 50 to be outside the normal operation range, the input voltage determiner 50 commands the switch unit 353 to be switched to a state of allowing the d-axis and q-axis feedback currents Id and Iq to flow respectively through the filters 355 and 356 as shown in FIG. 7. Moreover, the input voltage determiner 50 also commands the switch unit 253 to be switched to a state of allowing the d-axis and q-axis voltage command values Vd and Vq to be outputted respectively through the filters 255 and 256 as shown in FIG. 7.

Figure 8:
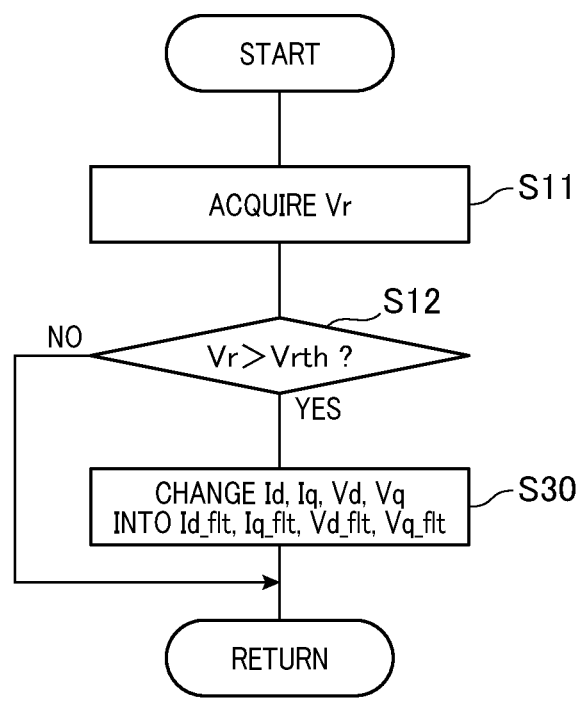
FIG. 8 is a flowchart illustrating a process of the control apparatus according to the third embodiment for switching control when an input voltage is excessive.

FIG. 8 shows a process performed by the ECU 101 according to the present embodiment for switching control according to the determination result of the input voltage determiner 50. In addition, this process is repeatedly performed during operation of the ECU 101.

As shown in FIG. 8, in the present embodiment, if the input voltage Vr is not higher than the voltage threshold Vrth and thus the determination at step S12 results in a "NO" answer, the process is directly terminated.

On the other hand, if the input voltage Vr is higher than the voltage threshold Vrth and thus the determination at step S12 results in a "YES" answer, the process proceeds to step S30.

At step S30, the command value calculator 203 changes the d-axis and q-axis feedback currents Id and Iq respectively into the d-axis and q-axis current filter values Id_flt and Iq_flt. Moreover, the command value calculator 203 also changes the d-axis and q-axis voltage command values Vd and Vq respectively into the d-axis and q-axis voltage command filter values Vd_flt and Vq_flt. Consequently, the responsiveness of the current feedback control performed by the command value calculator 203 is lowered, thereby suppressing control fluctuation caused by the reverse input of an external force to the motor 801 from the load side.

In addition, steps S11 and S12 in FIG. 8 are identical to those in FIG. 4 described in the first embodiment. Therefore, for the sake of avoiding redundancy, the explanation of steps S11 and S12 is not repeated in the present embodiment.

According to the present embodiment, it is possible to achieve the following advantageous effects.

In the present embodiment, the ECU 101 is configured to switch control (see step S12 of FIG. 8), when the input voltage Vr is determined by the input voltage determiner 50 to be outside the normal operation range, to suppress control fluctuation caused by the reverse input of an external force to the motor 801 from the load side.

With the above configuration, when an external force is inputted reversely to the motor 801 from the load side, it is possible to suitably suppress adverse effects on various controls due to the reverse input of the external force.

More particularly, in the present embodiment, when the input voltage Vr is determined by the input voltage determiner 50 to be outside the normal operation range, the command value calculator 203 lowers the responsiveness of the current feedback control to become lower than during normal operation of the motor 801.

With the above configuration, it is possible to reliably suppress control fluctuation caused by the reverse input of an external force to the motor 801 from the load side.

Still more particularly, in the present embodiment, the command value calculator 203 includes both the set of the switch unit 353 and the filters 355 and 356 and the set of the switch unit 253 and the filters 255 and 256. When the input voltage Vr is determined by the input voltage determiner 50 to be outside the normal operation range, the switch unit 353 is switched to the state of allowing the d-axis and q-axis feedback currents Id and Iq to flow respectively through the filters 355 and 356. Moreover, the switch unit 253 is switched to the state of allowing the d-axis and q-axis voltage command values Vd and Vq to be outputted respectively through the filters 255 and 256. Consequently, the d-axis and q-axis feedback currents Id and Iq are respectively changed into the d-axis and q-axis current filter values Id_flt and Iq_flt; the d-axis and q-axis voltage command values Vd and Vq are respectively changed into the d-axis and q-axis voltage command filter values Vd_flt and Vq_flt (see step S30 of FIG. 8).

With the above configuration, it is possible for the command value calculator 203 to reliably lower the responsiveness of the current feedback control to become lower than during normal operation of the motor 801.

Fourth Embodiment

Figure 9:
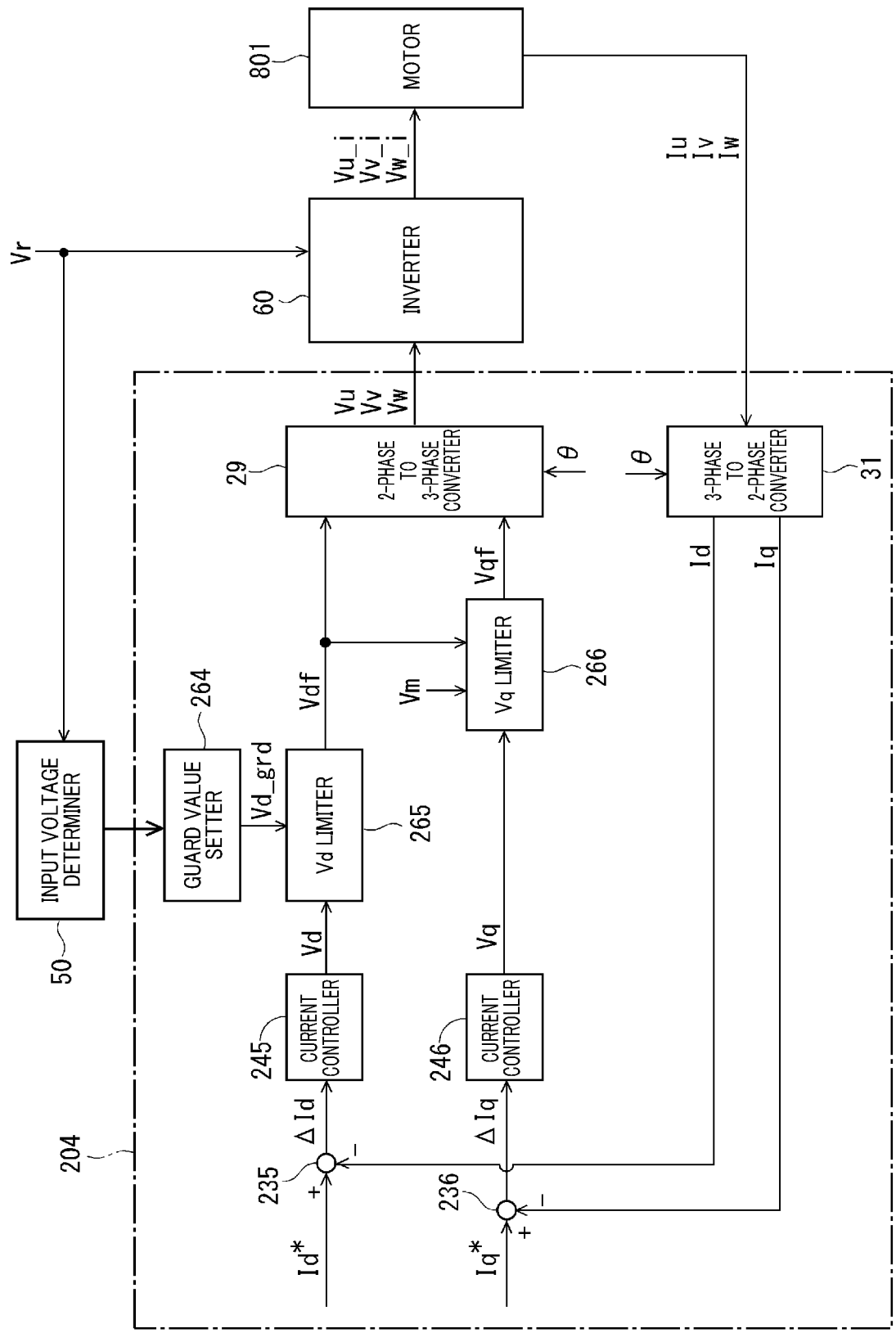
FIG. 9 is a control block diagram of the control apparatus according to the fourth embodiment.

As shown in FIG. 9, the command value calculator 204 according to the fourth embodiment includes a guard value setter 264 and a d-axis voltage command value limiter 265 (denoted by "Vd LIMITER" in FIG. 9).

The guard value setter 264 sets a guard value Vd_grd for the d-axis voltage command value Vd. The d-axis voltage command value limiter 265 limits the d-axis voltage command value Vd to the guard value Vd_grd set by the guard value setter 264, outputting a final d-axis voltage command value Vdf.

Figure 10A:
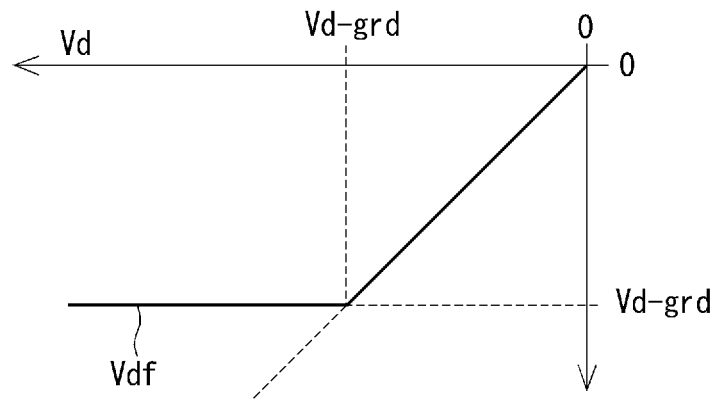
FIG. 10A is a graphic representation illustrating a method of limiting a d-axis voltage command value Vd according to the fourth embodiment.

As shown in FIG. 10A, during normal operation of the motor 801, the negative d-axis voltage command value Vd is limited to be greater than or equal to the negative guard value Vd_grd. In other words, the absolute value |Vd| of the d-axis voltage command value is limited to be less than or equal to the absolute value |Vd_grd| of the guard value.

Referring back to FIG. 9, the command value calculator 204 also includes a q-axis voltage command value limiter 266 (denoted by "Vq LIMITER" in FIG. 9).

Figure 10B:
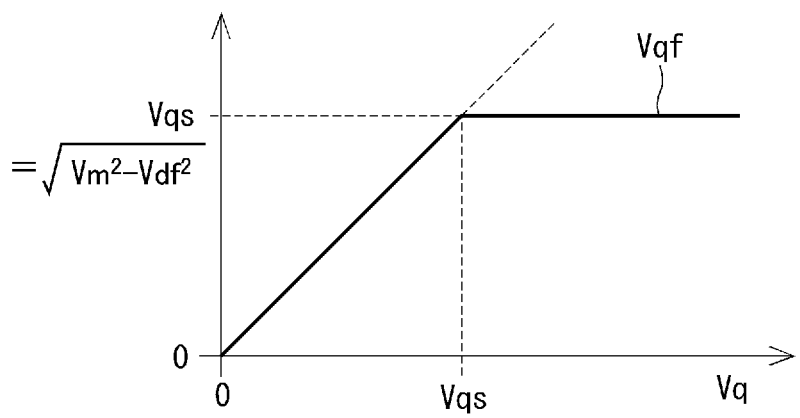
FIG. 10B is a graphic representation illustrating a method of limiting a q-axis voltage command value Vq according to the fourth embodiment.

As shown in FIG. 10B, the q-axis voltage command value limiter 266 limits the q-axis voltage command value Vq to a q-axis voltage command maximum value Vqs, outputting a final q-axis voltage command value Vqf. Here, the q-axis voltage command maximum value Vqs is calculated by the following Equation (1):

$$Vqs=\sqrt{(Vm^2-Vdf^2)} \quad (1)$$

where Vm is a maximum voltage and Vdf is the final d-axis voltage command value.

Figure 10C:
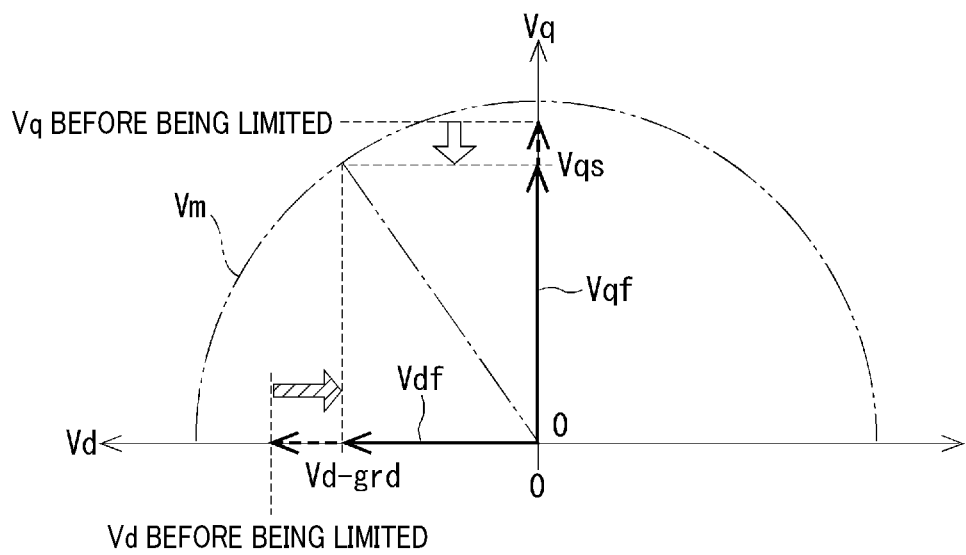
FIG. 10C is a vector diagram illustrating the d-axis and q-axis voltage command values Vd and Vq according to the fourth embodiment.

FIG. 10C is a vector diagram illustrating the limiting of the d-axis and q-axis voltage command values Vd and Vq according to the present embodiment. Specifically, in FIG. 10C, the limiting of the d-axis voltage command value Vd is illustrated with a hatched block arrow while the limiting of the q-axis voltage command value Vq is illustrated with a white block arrow.

During normal operation of the motor 801, the negative guard value Vd_grd is set to a relatively small value. That is, the absolute value |Vd_grd| of the guard value is set to a relatively large value. Here, a configuration where the d-axis voltage command value Vd is substantially not limited during normal operation of the motor 801 is construed as being equivalent to the case where the absolute value |Vd_grd| of the guard value is set to be sufficiently greater than the absolute value |Vd| of any practical d-axis voltage command value.

On the other hand, when the input voltage Vr is determined by the input voltage determiner 50 to be outside the normal operation range, the input voltage determiner 50 commands the guard value setter 264 to increase the negative guard value Vd_grd so as to become closer to 0 (zero). Consequently, the d-axis voltage command value Vd, which is substantially not limited during normal operation of the motor 801, becomes limited.

In addition, the limiting of the q-axis voltage command value Vq based on the final d-axis voltage command value Vdf is performed during normal operation of the motor 801 as well as when the input voltage Vr is excessive.

Figure 11:
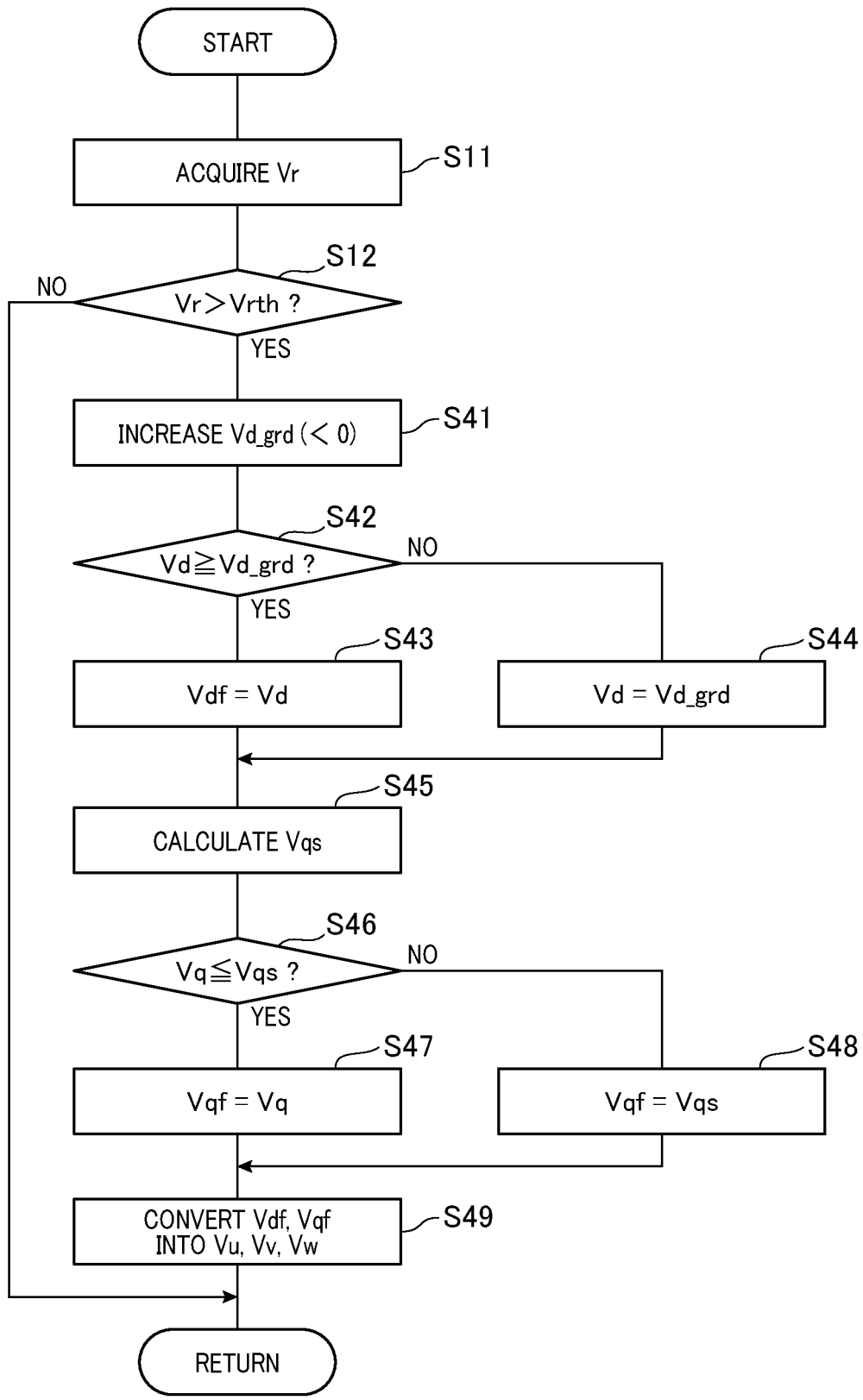
FIG. 11 is a flowchart illustrating a process of the control apparatus according to the fourth embodiment for switching control when an input voltage is excessive.

FIG. 11 shows a process performed by the ECU 101 according to the present embodiment for switching control according to the determination result of the input voltage determiner 50. In addition, this process is repeatedly performed during operation of the ECU 101.

As shown in FIG. 11, in the present embodiment, if the input voltage Vr is not higher than the voltage threshold Vrth and thus the determination at step S12 results in a "NO" answer, the process is directly terminated.

On the other hand, if the input voltage Vr is higher than the voltage threshold Vrth and thus the determination at step S12 results in a "YES" answer, the process proceeds to step S41.

At step S41, the guard value setter 264 increases the negative guard value Vd_grd, in other words, changes the negative guard value Vd_grd to become closer to 0.

At step S42, the d-axis voltage command value limiter 265 determines whether the negative d-axis voltage command value Vd outputted from the d-axis current controller 245 is greater than or equal to the guard value Vd_grd.

If the determination at step S42 results in a "YES" answer, the process proceeds to step S43.

At step S43, the d-axis voltage command value limiter 265 outputs the d-axis voltage command value Vd as the final d-axis voltage command value Vdf That is, the d-axis voltage command value Vd is not limited by the d-axis voltage command value limiter 265. Then, the process proceeds to step S45.

On the other hand, if the determination at step S42 results in a "NO" answer, the process proceeds to step S44.

At step S44, the d-axis voltage command value limiter 265 outputs the guard value Vd_grd as the final d-axis voltage command value Vdf. That is, the d-axis voltage command value Vd is limited to the guard value Vd_grd by the d-axis voltage command value limiter 265. Then, the process proceeds to step S45.

At step S45, the q-axis voltage command value limiter 266 calculates the q-axis voltage command maximum value Vqs by Equation (1).

At step S46, the q-axis voltage command value limiter 266 determines whether the q-axis voltage command value Vq outputted from the q-axis current controller 246 is less than or equal to the q-axis voltage command maximum value Vqs.

If the determination at step S46 results in a "YES" answer, the process proceeds to step S47.

At step S47, the q-axis voltage command value limiter 266 outputs the q-axis voltage command value Vq as the final q-axis voltage command value Vqf. That is, the q-axis voltage command value Vq is not limited by the q-axis voltage command value limiter 266. Then, the process proceeds to step S49.

On the other hand, if the determination at step S46 results in a "NO" answer, the process proceeds to step S48.

At step S48, the q-axis voltage command value limiter 266 outputs the q-axis voltage command maximum value Vqs as the final q-axis voltage command value Vqf. That is, the q-axis voltage command value Vq is limited to the q-axis voltage command maximum value Vqs by the q-axis voltage command value limiter 266. Then, the process proceeds to step S49.

At step S49, the 2-phase to 3-phase converter 29 converts the final d-axis voltage command value Vdf and the final q-axis voltage command value Vqf into the U-phase, V-phase and W-phase voltage command values Vu, Vv and Vw. Then, the 2-phase to 3-phase converter 29 outputs the resultant U-phase, V-phase and W-phase voltage command values Vu, Vv and Vw to the inverter 60.

In addition, steps S11 and S12 in FIG. 11 are identical to those in FIG. 4 described in the first embodiment. Therefore, for the sake of avoiding redundancy, the explanation of steps S11 and S12 is not repeated in the present embodiment.

According to the present embodiment, it is possible to achieve the following advantageous effects.

In the present embodiment, the ECU 101 is configured to switch control (see step S12 of FIG. 11), when the input voltage Vr is determined by the input voltage determiner 50 to be outside the normal operation range, to suppress control fluctuation caused by the reverse input of an external force to the motor 801 from the load side.

With the above configuration, when an external force is inputted reversely to the motor 801 from the load side, it is possible to suitably suppress adverse effects on various controls due to the reverse input of the external force.

More particularly, in the present embodiment, the command value calculator 204 includes the guard value setter 264 that sets the guard value Vd_grd, the d-axis voltage command value limiter 265 that limits the d-axis voltage command value Vd to the guard value Vd_grd set by the guard value setter 264, and the q-axis voltage command value limiter 266 that limits the q-axis voltage command value Vq to the q-axis voltage command maximum value Vqs calculated by Equation (1) based on the output (i.e., the final d-axis voltage command value Vdf) of the d-axis voltage command value limiter 265. Moreover, when the input voltage Vr is determined by the input voltage determiner 50 to be outside the normal operation range, the guard value setter 264 changes the guard value Vd_grd to become closer to 0 than during normal operation of the motor 801 (see step S41 of FIG. 11).

With the above configuration, it is possible to reliably suppress control fluctuation caused by the reverse input of an external force to the motor 801 from the load side.

Moreover, in the present embodiment, the d-axis voltage command value Vd is directly limited by changing the guard value Vd_grd, while the q-axis voltage command value Vq is limited based on the output (i.e., the final d-axis voltage command value Vdf) of the d-axis voltage command value limiter 265. That is, the limiting of the d-axis voltage command value Vd is prioritized while relaxing the liming of the q-axis voltage command value Vq. Consequently, it is possible to prevent reduction in required torque.

Alternatively, it is possible to prioritize the limiting of the q-axis voltage command value Vq while relaxing the limiting of the d-axis voltage command value Vd. Otherwise, it is also possible to directly limit both the d-axis voltage command value Vd and the q-axis voltage command value Vq.

Moreover, it is also possible to limit, instead of the voltage command values Vd and Vq, the absolute values of the current command values Id* and Iq* to be less than or equal to the absolute values of respective guard values.

Fifth Embodiment

Figure 12:
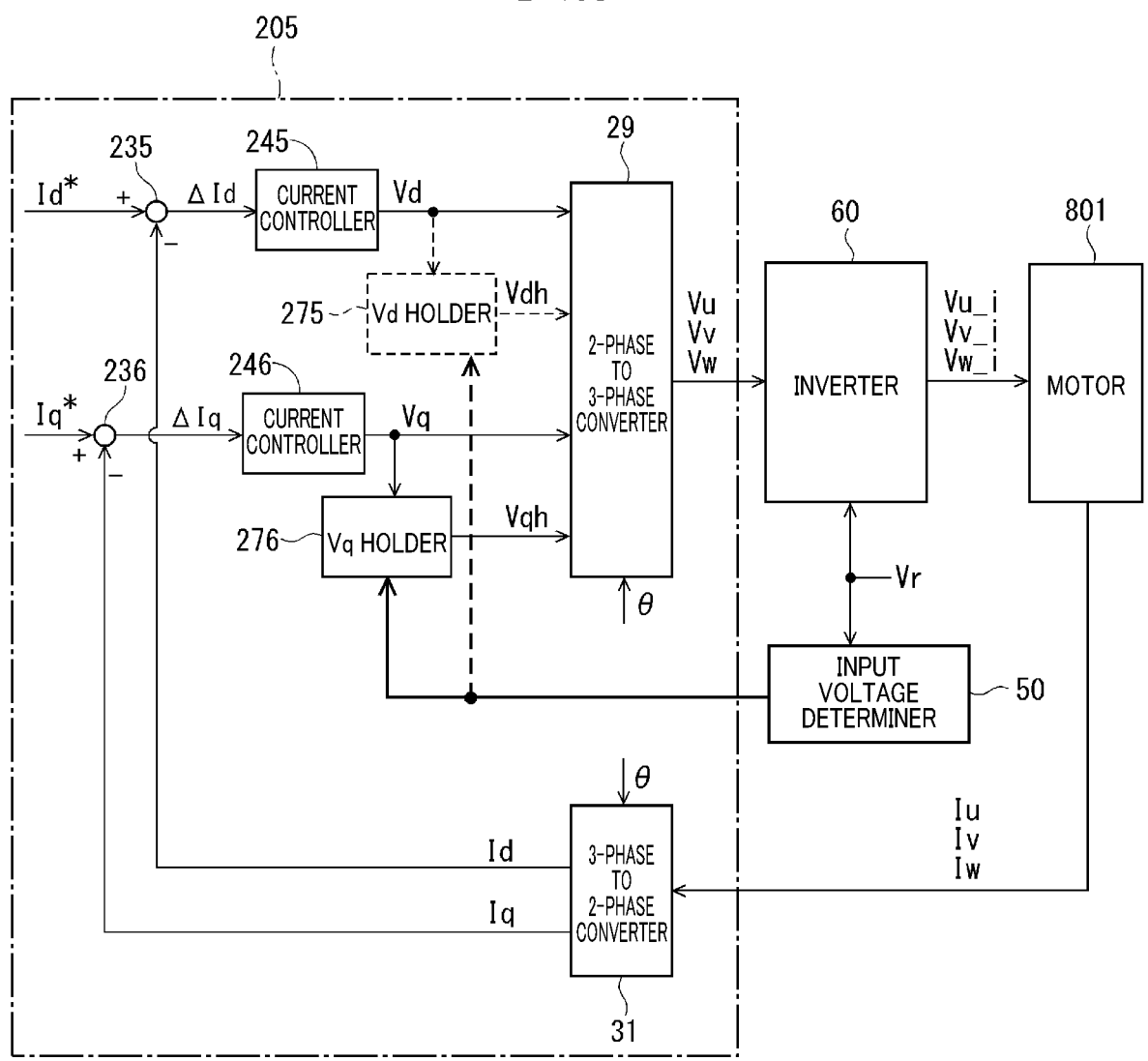
FIG. 12 is a control block diagram of the control apparatus according to the fifth embodiment.

Referring to FIG. 12, the command value calculator 205 according to the fifth embodiment includes a q-axis voltage command value holder 276 (denoted by "Vq HOLDER" enclosed with a continuous line in FIG. 12).

It should be noted that the command value calculator 205 may also include a d-axis voltage command value holder 275 (denoted by "Vd HOLDER" enclosed with a dashed line in FIG. 12). Moreover, it also should be noted that the command value calculator 205 may further include other command value holders, such as d-axis and q-axis current command value holders and U-phase, V-phase and W-phase voltage command value holders (or U-phase, V-phase and W-phase voltage duty holders).

In the present embodiment, the q-axis voltage command value holder 276 stores and holds therein the q-axis voltage command value Vq during normal operation of the motor 801 as a hold value Vqh over a period of time while updating the hold value Vqh in a predetermined cycle. Moreover, when the input voltage Vr is determined by the input voltage determiner 50 to be outside the normal operation range, the input voltage determiner 50 commands the command value calculator 205 to generate the U-phase, V-phase and W-phase voltage command values Vu, Vv and Vw using the hold value Vqh that is held in the q-axis voltage command value holder 276 immediately before the input voltage determination. Thus, the q-axis voltage command value Vq during normal operation of the motor 801, which is held as the hold value Vqh in the q-axis voltage command value holder 276 immediately before the input voltage determination, is inputted to the 2-phase to 3-phase converter 29 and used for the generation of the U-phase, V-phase and W-phase voltage command values Vu, Vv and Vw in the 2-phase to 3-phase converter 29.

Figure 13:
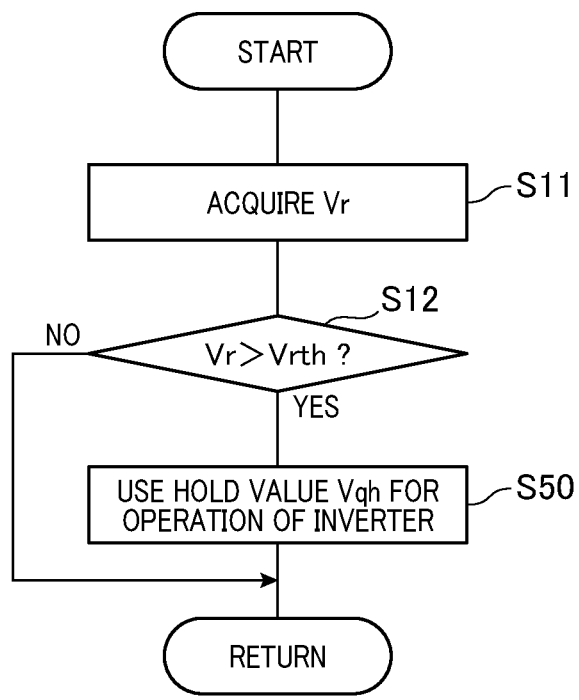
FIG. 13 is a flowchart illustrating a process of the control apparatus according to the fifth embodiment for switching control when an input voltage is excessive.

FIG. 13 shows a process performed by the ECU 101 according to the present embodiment for switching control according to the determination result of the input voltage determiner 50. In addition, this process is repeatedly performed during operation of the ECU 101.

As shown in FIG. 13, in the present embodiment, if the input voltage Vr is not higher than the voltage threshold Vrth and thus the determination at step S12 results in a "NO" answer, the process is directly terminated.

On the other hand, if the input voltage Vr is higher than the voltage threshold Vrth and thus the determination at step S12 results in a "YES" answer, the process proceeds to step S50.

At step S50, the hold value Vqh, which is held in the q-axis voltage command value holder 276 immediately before the determination at step S12, is inputted to the 2-phase to 3-phase converter 29 and used for the generation of the U-phase, V-phase and W-phase voltage command values Vu, Vv and Vw in the 2-phase to 3-phase converter 29. That is, the hold value Vqh is used for the operation of the inverter 60 by the command value calculator 205.

According to the present embodiment, it is possible to achieve the following advantageous effects.

In the present embodiment, the ECU 101 is configured to switch control (see step S12 of FIG. 13), when the input voltage Vr is determined by the input voltage determiner 50 to be outside the normal operation range, to suppress control fluctuation caused by the reverse input of an external force to the motor 801 from the load side.

With the above configuration, when an external force is inputted reversely to the motor 801 from the load side, it is possible to suitably suppress adverse effects on various controls due to the reverse input of the external force.

More particularly, in the present embodiment, the command value calculator 205 includes the q-axis voltage command value holder 276 that stores and holds therein the q-axis voltage command value Vq during normal operation of the motor 801. Moreover, when the input voltage Vr is determined by the input voltage determiner 50 to be outside the normal operation range, the command value calculator 205 uses, for the operation of the inverter 60, the q-axis voltage command value Vq held in the q-axis voltage command value holder 276 (see step S50 of FIG. 13).

With the above configuration, it is possible to reliably suppress control fluctuation caused by the reverse input of an external force to the motor 801 from the load side. In particular, using the q-axis voltage command value Vq held in the q-axis voltage command value holder 276, it is possible to reliably suppress torque fluctuation of the motor 801.

Sixth Embodiment

Figure 14:
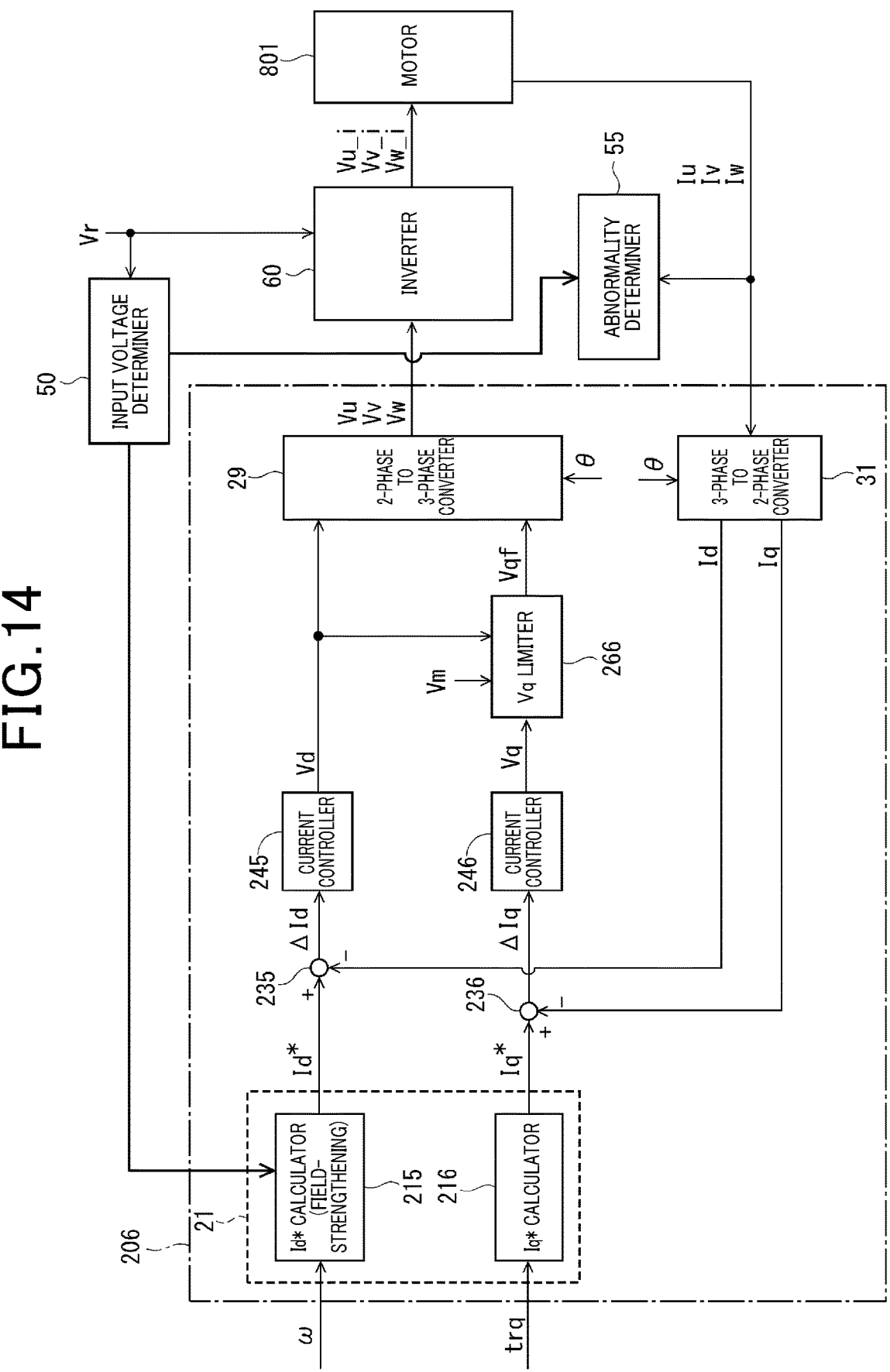
FIG. 14 is a control block diagram of the control apparatus according to the sixth embodiment.

As shown in FIG. 14, in the sixth embodiment, the microcomputer 67 includes a command value calculator 206, an input voltage determiner 50 and an abnormality determiner 55 as in the first embodiment.

Moreover, in the sixth embodiment, the current command value calculator 21 of the command value calculator 206 is comprised of a d-axis current command value calculator 215 (denoted by "Id* CALCULATOR" in FIG. 14) and a q-axis current command value calculator 216 (denoted by "Iq* CALCULATOR" in FIG. 14).

The d-axis current command value calculator 215 acquires (or calculates) an electrical angular speed ω (degrees) which is a time differential value of the electrical angle θ of the motor 801. In addition, hereinafter, the RPM (Revolutions per Minute) of the motor 801, which can be obtained by multiplying the electrical angular speed ω by a predetermined factor of proportionality, will be referred to as "motor RPM ω".

In the present embodiment, the d-axis current command value calculator 215 calculates, by field-strengthening control, the d-axis current command value Id* according to the motor RPM ω.

Figure 15A:
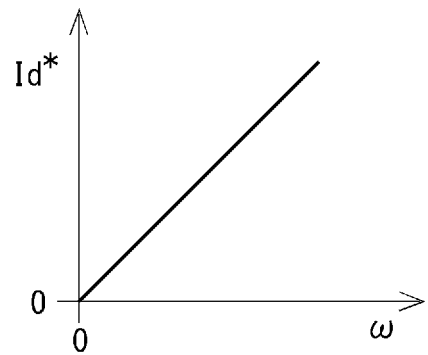
FIG. 15A is a graphic representation illustrating the relationship between motor RPM w and d-axis current command value Id* according to the sixth embodiment.

Specifically, as shown in FIG. 15A, the d-axis current command value calculator 215 calculates the d-axis current command value Id* so as to be directly proportional to the motor RPM co. That is, the higher the motor RPM co, the greater the positive d-axis current command value Id*.

The q-axis current command value calculator 216 calculates the q-axis current command value Iq* so as to enable the motor 801 to output required steering assist torque according to the detected steering torque trq.

Figure 15B:
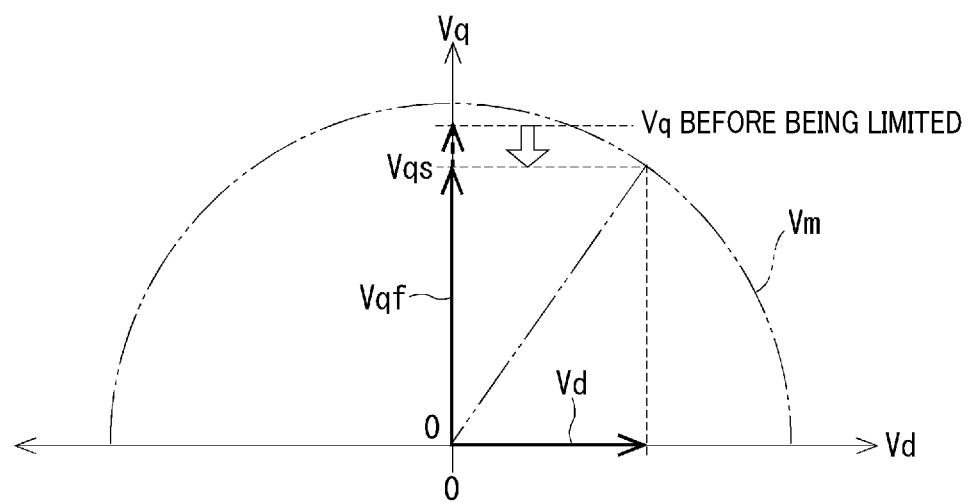
FIG. 15B is a vector diagram illustrating d-axis and q-axis voltage command values Vd and Vq according to the sixth embodiment.

Referring to FIG. 15B, in the present embodiment, a positive d-axis voltage command value Vd is calculated by field-strengthening control. Moreover, as in the fourth embodiment, the q-axis voltage command value limiter 266 limits the q-axis voltage command value Vq to the q-axis voltage command maximum value Vqs, outputting the final q-axis voltage command value Vqf.

Figure 16:
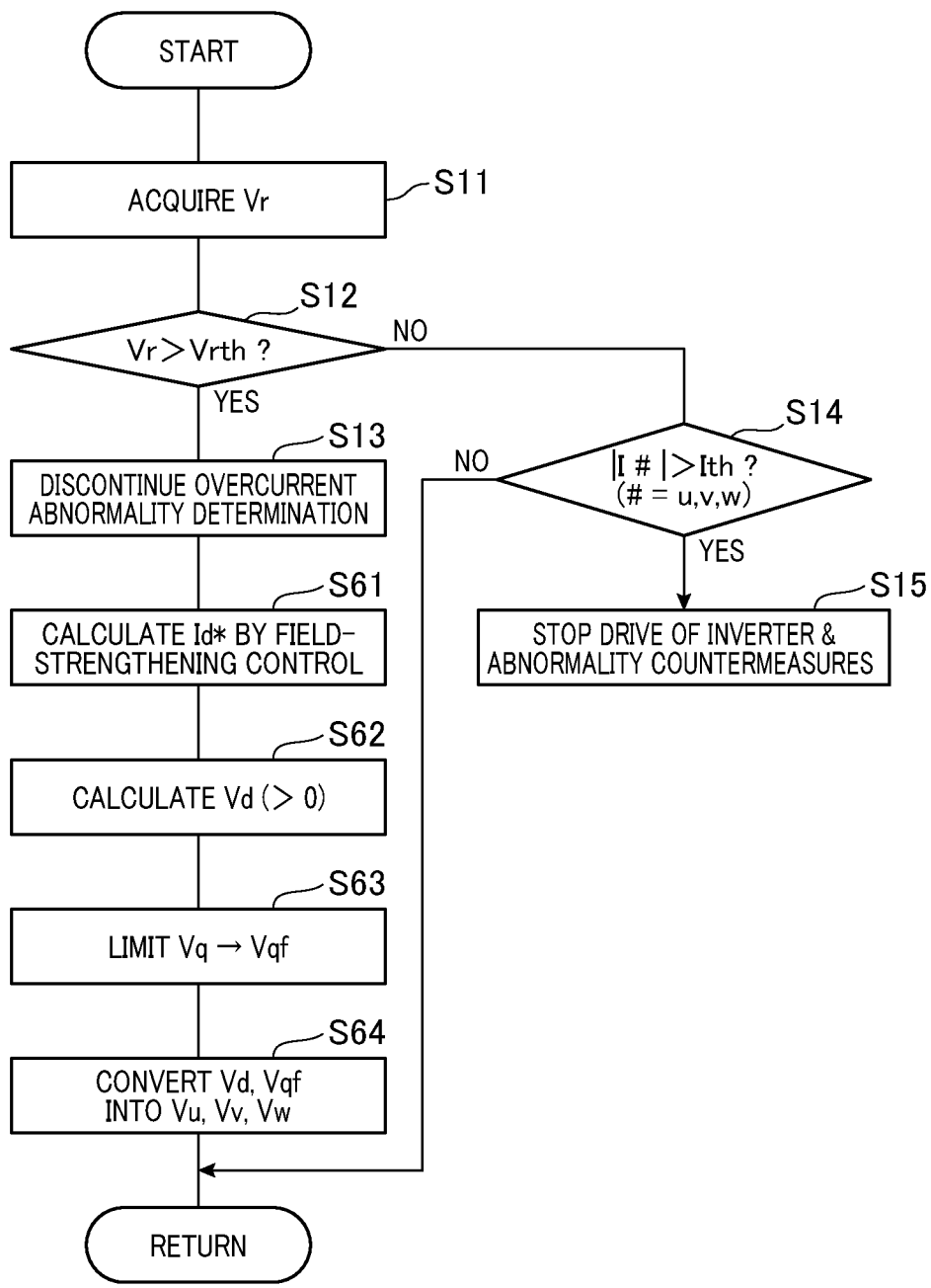
FIG. 16 is a flowchart illustrating a process of the control apparatus according to the sixth embodiment for switching control when an input voltage is excessive.

FIG. 16 shows a process performed by the ECU 101 according to the present embodiment for switching control according to the determination result of the input voltage determiner 50. In addition, this process is repeatedly performed during operation of the ECU 101.

As shown in FIG. 16, in the present embodiment, if the input voltage Vr is higher than the voltage threshold Vrth and thus the determination at step S12 results in a "YES" answer, the process proceeds to step S13.

At step S13, the input voltage determiner 50 commands the abnormality determiner 55 to discontinue the overcurrent abnormality determination. Consequently, the steering assist function of the electric power steering apparatus 90 is prevented from being disabled due to an erroneous determination; and the driver is prevented from receiving a false warning.

At subsequent step 61, the d-axis current command value calculator 215 calculates, by field-strengthening control, the d-axis current command value Id* according to the motor RPM ω.

At step S62, the current controller 245 calculates the positive d-axis voltage command value Vd by PI control so as to make the deviation ΔId approach 0. Here, the deviation ΔId is the deviation between the d-axis current command value Id* and the d-axis feedback current Id.

At step S63, the q-axis voltage command value limiter 266 limits the q-axis voltage command value Vq based on the d-axis voltage command value Vd, outputting the final q-axis voltage command value Vqf.

At step S64, the 2-phase to 3-phase converter 29 converts the d-axis voltage command value Vd and the final q-axis voltage command value Vqf into the U-phase, V-phase and W-phase voltage command values Vu, Vv and Vw. Then, the 2-phase to 3-phase converter 29 outputs the resultant U-phase, V-phase and W-phase voltage command values Vu, Vv and Vw to the inverter 60.

It should be noted that in the above-described process, step S13 may alternatively be performed after steps S61-S64.

In addition, steps S11-S15 in FIG. 16 are identical to those in FIG. 4 described in the first embodiment. Therefore, for the sake of avoiding redundancy, the explanation of steps S11-S15 is not repeated in the present embodiment.

According to the present embodiment, it is possible to achieve the following advantageous effects.

In the present embodiment, the ECU 101 is configured to switch control (see step S12 of FIG. 16), when the input voltage Vr is determined by the input voltage determiner 50 to be outside the normal operation range, to ignore change in the phase currents Iu, Iv, Iw caused by the reverse input of an external force to the motor 801 from the load side.

With the above configuration, when an external force is inputted reversely to the motor 801 from the load side, it is possible to suitably suppress adverse effects on various controls due to the reverse input of the external force.

More particularly, in the present embodiment, the ECU 101 includes the abnormality determiner 55 that performs the overcurrent abnormality determination according to whether the phase currents Iu, Iv and Iw flowing in the inverter 60 or the phase coils 81, 82 and 83 of the motor 801 exceed the current threshold Ith (see step S14 of FIG. 16). Moreover, when the input voltage Vr is determined by the input voltage determiner 50 to be outside the normal operation range, the abnormality determiner 55 discontinues the overcurrent abnormality determination (see step S13 of FIG. 16).

With the above configuration, when the phase currents Iu, Iv and Iw are temporarily increased due to a counterelectromotive force that is generated by the reverse input of an external force to the motor 801, the abnormality determiner 55 is prevented from erroneously determining that an overcurrent abnormality has occurred although no short-circuit fault has actually occurred.

Moreover, in the present embodiment, the ECU 101 is further configured to perform, when the input voltage Vr is determined by the input voltage determiner 50 to be outside the normal operation range, field-strengthening control to increase the positive d-axis current Id according to the motor RPM ω.

With the above configuration, when an external force is inputted reversely to the motor 801 from the load side, it is possible to suppress the increase in the motor RPM ω (or the rotation angular speed of the motor 801) caused by the reverse input of the external force. Consequently, it is possible to quickly lower the input voltage Vr, which has been increased due to the reverse input of the external force, to return to the normal operation range. As a result, it is possible to resume in an early stage various controls performed during normal operation of the motor 801 which include the overcurrent abnormality determination.

In addition, it should be noted that field-strengthening control as described above may also be performed in combination with the processes of the ECU 101 according to the second to the fifth embodiments. Moreover, in the configuration according to the fifth embodiment where only the q-axis voltage command value Vq is held, it is possible to change the d-axis voltage command value Vd to the positive side by field-strengthening control.

Seventh Embodiment

FIG. 17 shows the overall configuration of the ECU 107 according to the seventh embodiment.

As mentioned previously, the ECU 107 is a two-system control apparatus for controlling (or driving) a three-phase brushless motor 802 that has two three-phase coil sets 841 and 842 magnetically coupled to each other.

As shown in FIG. 17, the ECU 107 includes first and second inverters 601 and 602, first and second current sensors 701 and 702, a microcomputer 67 and a drive circuit (or pre-driver) 68. Moreover, the microcomputer 67 includes a command value calculator 207 and an input voltage determiner 50.

Hereinafter, for the sake of avoiding redundancy, the differences of the two-system ECU 107 according to the present embodiment from the one-system ECU 101 according to the first embodiment will be mainly described.

In the present embodiment, the first three-phase coil set 841 of the motor 802, the first inverter 601 for energizing the first three-phase coil set 841 and a group of elements for controlling the energization of the first three-phase coil set 841 together constitute the first system. Similarly, the second three-phase coil set 842 of the motor 802, the second inverter 602 for energizing the second three-phase coil set 842 and a group of elements for controlling the energization of the second three-phase coil set 842 together constitute the second system.

Moreover, in the present embodiment, for the sake of distinction, "first" is placed before the name of each element of the first system, whereas "second" is placed before the name of each element of the second system. Further, each element of the first system is designated by a three-digit reference numeral whose last digit is "1", whereas each element of the second system is designated by a three-digit reference numeral whose last digit is "2". Similarly, each current or voltage of the first system is designated by a reference sign with "1" suffixed thereto, whereas each current or voltage of the second system is designated by a reference sign with "2" suffixed thereto.

In the motor 802, the first three-phase coil set 841 and the second three-phase coil set 842 are arranged so that each of the U-phase, V-phase and W-phase coils 811, 821 and 831 of the first coil set 841 is circumferentially offset by 30° in electrical angle from a corresponding one of the U-phase, V-phase and W-phase coils 812, 822 and 832 of the second coil set 842. In addition, such an arrangement of two three-phase coil sets in a rotating electric machine is disclosed in Japanese Patent No. JP5556845B2, the content of which is hereby incorporated by reference in its entirety into this application.

The first inverter 601 includes six switching elements 611, 621, 631, 641, 651 and 661. The first inverter 601 converts, through operation of the switching elements 611-661, a first input voltage Vr1 into U-phase, V-phase and W-phase voltages Vu1_$i$, Vv1_$i$ and Vw1_$i$; the first input voltage Vr1 is a voltage between a high-potential line and a low-potential line of the first inverter 601. Then, the first inverter 601 applies the resultant U-phase, V-phase and W-phase voltages Vu1_$i$, Vv1_$i$ and Vw1_$i$ respectively to the U-phase, V-phase and W-phase coils 811, 821 and 831 of the first coil set 841 of the motor 802.

Similarly, the second inverter 602 includes six switching elements 612, 622, 632, 642, 652 and 662. The second inverter 602 converts, through operation of the switching elements 612-662, a second input voltage Vr2 into U-phase, V-phase and W-phase voltages Vu2_$i$, Vv2_$i$ and Vw2_$i$: the second input voltage Vr2 is a voltage between a high-potential line and a low-potential line of the second inverter 602. Then, the second inverter 602 applies the resultant U-phase, V-phase and W-phase voltages Vu2_$i$, Vv2_$i$ and Vw2_$i$ respectively to the U-phase, V-phase and W-phase coils 812, 822 and 832 of the second coil set 842 of the motor 802.

As shown in FIG. 17, the first and second inverters 601 and 602 are electrically connected in parallel to each other with respect to a battery 11. On the input side (or upstream side) of the first and second inverters 601 and 602, there is provided a smoothing capacitor 13. Moreover, in the high-voltage line of the first inverter 601, there is provided a first power-source relay 121 between the smoothing capacitor 13 and the first inverter 601. Similarly, in the high-voltage line of the second inverter 602, there is provided a second power-source relay 122 between the smoothing capacitor 13 and the second inverter 602.

In the present embodiment, each of the first and second input voltages Vr1 and Vr2 is equal to the voltage across the smoothing capacitor 13. That is, the first and second input voltages Vr1 and Vr2 are equal to each other. Moreover, each of the U-phase, V-phase and W-phase voltages Vu1_$i$, Vv1_$i$ and Vw1_$i$ generated by the first inverter 601 is different in phase by 30° in electrical angle from a corresponding one of the U-phase, V-phase and W-phase voltages Vu2_$i$, Vv2_$i$ and Vw2_$i$ generated by the second inverter 602.

The first current sensor 701 includes current sensing elements 711, 721 and 731 for respectively detecting U-phase, V-phase and W-phase currents Iu1, Iv1 and Iw1 of the first system. The first current sensor 701 feedbacks the detected phase currents Iu1, Iv1 and Iw1 of the first system to the command value calculator 207 of the microcomputer 67.

The second current sensor 702 includes current sensing elements 712, 722 and 732 for respectively detecting U-phase, V-phase and W-phase currents Iu2, Iv2 and Iw2 of the second system. The second current sensor 702 feedbacks the detected phase currents Iu2, Iv2 and Iw2 of the second system to the command value calculator 207 of the microcomputer 67.

The command value calculator 207 calculates command values based on information including the detected steering torque trq, the detected phase currents Iu1, Iv1, Iw1, Iu2, Iv2 and Iw2, and the detected electrical angle θ of the motor 802. Then, the energization of the motor 802 is controlled through operation of the first and second inverters 601 and 602 in accordance with the command values calculated by the command value calculator 207.

The input voltage determiner 50 acquires information on the first and second input voltages Vr1 and Vr2 that are detected by, for example, a voltage sensor (not shown). Then, the input voltage determiner 50 determines whether the first and second input voltages Vr1 and Vr2 are within a normal operation range. Here, the "normal operation range" denotes the range of the first and second input voltages Vr1 and Vr2 during normal operation of the motor 802.

In the present embodiment, the command value calculator 207 is configured to feedback-control the actual current sum of and the actual current difference between the first and second systems. In addition, such a current-sum and current-difference feedback control is disclosed in aforementioned Japanese Patent No. JP5556845B2, and particularly effective in suppressing torque ripple and improving the thermal characteristics of a rotating electric machine.

Figure 18:
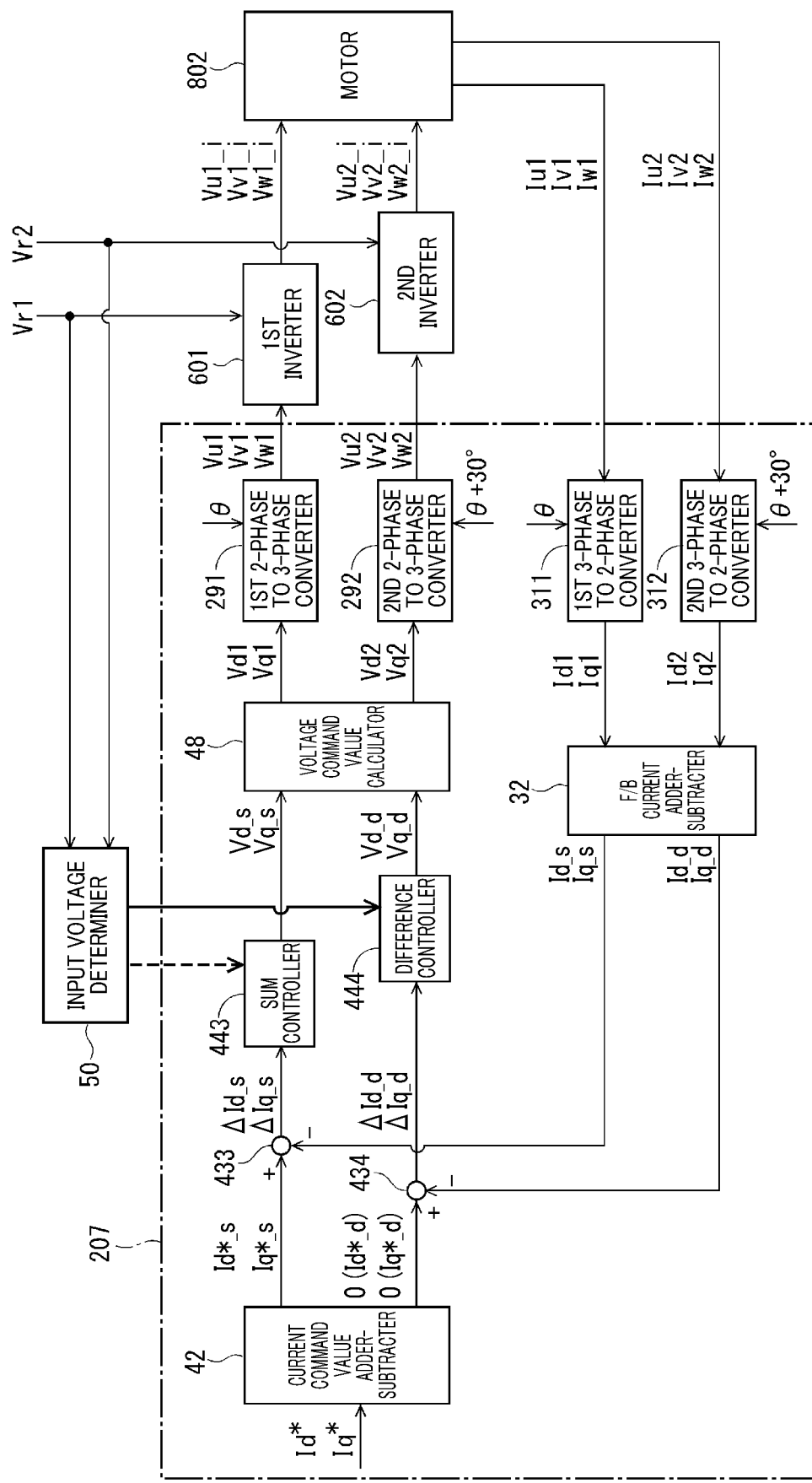
FIG. 18 is a control block diagram of the control apparatus according to the seventh embodiment.

As shown in FIG. 18, the command value calculator 207 includes a current command value adder-subtracter 42, a current-sum deviation calculator 433, a current-difference deviation calculator 434, a current sum controller 443, a current difference controller 444, a voltage command value calculator 48, first and second 2-phase to 3-phase converters 291 and 292, first and second 3-phase to 2-phase converters 311 and 312, and a feedback (abbreviated to F/B in FIG. 18) current adder-subtracter 32.

The current command value adder-subtracter 42 calculates: Id*_s which is the sum of d-axis current command values Id* of the first and second systems; Iq*_s which is the sum of q-axis current command values Iq* of the first and second systems. Id*_d which is the difference between the d-axis current command values Id* of the first and second systems; and Iq*_d which is the difference between the q-axis current command values Iq* of the first and second systems.

In addition, in the present embodiment, the first and second systems have the same electrical characteristics. Therefore, the d-axis current command values Id* of the first and second systems are equal to each other: the q-axis current command values Iq* of the first and second systems are equal to each other. Accordingly, Id*_s and Iq*_s are respectively equal to 2×Id* and 2×Iq*; Id*_d and Iq*_d are both equal to 0 (zero).

It should be noted that the command value calculator 207 may alternatively be configured to have no current command value adder-subtracter 42 provided therein and to directly set that: Id*_s=2×Id*; Iq*_s=2×Iq*; Id*_d=0: and Iq*_d=0.

The first 3-phase to 2-phase converter 311 converts, using the electrical angle θ detected by the rotation angle sensor 85, the U-phase, V-phase and W-phase currents Iu1, Iv1 and Iw1 of the first system detected by the first current sensor 701 into d-axis and q-axis feedback currents Id1 and Iq1 of the first system. Then, the first 3-phase to 2-phase converter 311 outputs the resultant d-axis and q-axis feedback currents Id1 and Iq1 to the feedback current adder-subtracter 32.

The second 3-phase to 2-phase converter 312 converts, using an electrical angle (θ+30), the U-phase, V-phase and W-phase currents Iu2, Iv2 and Iw2 of the second system detected by the second current sensor 702 into d-axis and q-axis feedback currents Id2 and Iq2 of the second system. Then, the second 3-phase to 2-phase converter 312 outputs the resultant d-axis and q-axis feedback currents Id2 and Iq2 to the feedback current adder-subtracter 32.

The feedback current adder-subtracter 32 calculates: Id_s which is the sum of the d-axis feedback currents Id1 and Id2 of the first and second systems; Iq_s which is the sum of the q-axis feedback currents Iq1 and Iq2 of the first and second systems: Id_d which is the difference between the d-axis feedback currents Id1 and Id2 of the first and second systems: and Iq_d which is the difference between the q-axis feedback currents Iq1 and Iq2 of the first and second systems.

The current-sum deviation calculator 433 calculates: a d-axis current-sum deviation ΔId_s which is the deviation between Id*_s and Id_s: and a q-axis current-sum deviation ΔIq_s which is the deviation between Iq*_s and Iq_s.

The current-difference deviation calculator 434 calculates: a d-axis current-difference deviation ΔId_d which is the deviation between Id*_d and Id_d: and a q-axis current-difference deviation ΔIq_d which is the deviation between Iq*_d and Iq_d.

The current sum controller 443 calculates Vd_s and Vq_s by PI control so as to make the d-axis and q-axis current-sum deviations ΔId_s and ΔIq_s approach 0. Here, Vd_s is the sum of d-axis voltage command values of the first and second systems; Vq_s is the sum of q-axis voltage command values of the first and second systems.

The current difference controller 444 calculates Vd_d and Vq_d by PI control so as to make the d-axis and q-axis current-difference deviations ΔId_d and ΔIq_d approach 0. Here, Vd_d is the difference between the d-axis voltage command values of the first and second systems; Vq_d is the difference between the q-axis voltage command values of the first and second systems.

In addition, though not shown in FIG. 18, the current sum controller 443 and the current difference controller 444 according to the present embodiment have a similar configuration to the current controllers 245 and 246 according to the second embodiment (see FIG. 5). More specifically, in the present embodiment, the current sum controller 443 includes a proportional gain multiplier that multiplies the d-axis and q-axis current-sum deviations ΔId_s and ΔIq_s by a proportional gain Kp_s and an integral gain multiplier that multiplies ΔId_s and ΔIq_s by an integral gain Ki_s. Similarly, the current difference controller 444 includes a proportional gain multiplier that multiplies the d-axis and q-axis current-difference deviations ΔId_d and ΔIq_d by a proportional gain Kp_d and an integral gain multiplier that multiplies ΔId_d and ΔIq_d by an integral gain Ki_d.

The voltage command value calculator 48 calculates the d-axis and q-axis voltage command values Vd1 and Vq1 of the first system and the d-axis and q-axis voltage command values Vd2 and Vq2 of the second system on the basis of Vd_s, Vq_s, Vd_d and Vq_d and by the following Equations (2.1)-(2.4):

$$Vd1=(Vd\_s+Vd\_d)/2 \quad (2.1)$$

$$Vq1=(Vq\_s+Vq\_d)/2 \quad (2.2)$$

$$Vd2=(Vd\_s-Vd\_d)/2 \quad (2.3)$$

$$Vq2=(Vq\_s-Vq\_d)/2 \quad (2.4)$$

The first 2-phase to 3-phase converter 291 converts, using the electrical angle θ detected by the rotation angle sensor 85, the d-axis and q-axis voltage command values Vd1 and Vq1 into U-phase, V-phase and W-phase voltage command values Vu1, Vv1 and Vw1. Then, the first 2-phase to 3-phase converter 291 outputs the resultant U-phase. V-phase and W-phase voltage command values Vu1, Vv1 and Vw1 to the first inverter 601.

The second 2-phase to 3-phase converter 292 converts, using the electrical angle (θ+30°), the d-axis and q-axis voltage command values Vd2 and Vq2 into U-phase, V-phase and W-phase voltage command values Vu2, Vv2 and Vw2. Then, the second 2-phase to 3-phase converter 292 outputs the resultant U-phase. V-phase and W-phase voltage command values Vu2, Vv2 and Vw2 to the second inverter 602.

In the present embodiment, when at least one of the first and second input voltages Vr1 and Vr2 is determined by the input voltage determiner 50 to be higher than the voltage threshold Vrth, the input voltage determiner 50 commands the command value calculator 207 to perform a PI gain reducing process as in either of the following two examples.

Specifically, in the first example, as illustrated with both a solid-line arrow and a dashed-line arrow in FIG. 18, the input voltage determiner 50 commands both the current sum controller 443 and the current difference controller 444 of the command value calculator 207 to reduce their respective PI gains. Consequently, the responsiveness of the current feedback control performed by the command value calculator 207 is lowered overall.

In addition, in the first example, it is possible to achieve the same advantageous effects as achievable in the case of controlling the first and second systems separately and lowering the PI gains of each of the first and second systems in a manner as described in the second embodiment.

On the other hand, in the second example, as illustrated with the solid-line arrow in FIG. 18, the input voltage determiner 50 commands only the current difference controller 444 of the command value calculator 207 to reduce its PI gains.

As disclosed in FIG. 14(b) of Japanese Patent No. JP5556845B2, when the current phase difference between the first and second systems is equal to 30° in electrical angle, the sixth harmonic components of the currents of the two systems are in the same phase in the current difference control. Consequently, with increase in the induced voltage during high-speed rotation of the motor 802, the current strain increases and thus noise and/or vibration may be generated. Therefore, prioritizing reduction of the PI gains of the current difference controller 444 when at least one of the first and second input voltages Vr1 and Vr2 is excessive, it is possible to suppress the adverse effects of the sixth harmonic components. Moreover, according to the disclosure of the above patent document, the higher the RPM of the motor 802, the more reduction in the PI gains of the current difference controller 444 is preferable.

In addition, it should be noted that when at least one of the first and second input voltages Vr1 and Vr2 is determined by the input voltage determiner 50 to be higher than the voltage threshold Vrth, the ECU 107 may alternatively perform those processes which are performed in the third to the sixth embodiments when the input voltage Ir of the single inverter 60 is excessive.

FIG. 19 shows a process performed by the ECU 107 according to the present embodiment for switching control according to the determination result of the input voltage determiner 50. In addition, this process is repeatedly performed during operation of the ECU 107.

First, at step S71, the input voltage determiner 50 acquires both the first and second input voltages Vr1 and Vr2.

At step S72, the input voltage determiner 50 determines whether either of the two input voltages Vr1 and Vr2 is higher than the voltage threshold Vrth.

If the determination at step S72 results in a "NO" answer, the process is directly terminated.

On the other hand, if the determination at step S72 results in a "YES" answer, the process proceeds to step S73.

At step S73, the command value calculator 207 reduces the PI gains of both the current sum controller 443 and the current difference controller 444 or the PI gains of only the current difference controller 444 to become less than during normal operation of the motor 802. In other words, the command value calculator 207 reduces the PI gains of at least the current difference controller 444, of the current sum controller 443 and the current difference controller 444, to become less than during normal operation of the motor 802.

According to the present embodiment, it is possible to achieve the following advantageous effects.

In the present embodiment, the ECU 107 is configured to switch control (see step S72 of FIG. 19), when at least one of the first and second input voltages Vr1 and Vr2 is determined by the input voltage determiner 50 to be outside the normal operation range, to suppress control fluctuation caused by the reverse input of an external force to the motor 802 from the load side.

With the above configuration, when an external force is inputted reversely to the motor 802 from the load side, it is possible to suitably suppress adverse effects on various controls due to the reverse input of the external force.

More particularly, in the present embodiment, when at least one of the first and second input voltages Vr1 and Vr2 is determined by the input voltage determiner 50 to be outside the normal operation range, the command value calculator 207 lowers the responsiveness of the current feedback control to become lower than during normal operation of the motor 802.

With the above configuration, it is possible to reliably suppress control fluctuation caused by the reverse input of an external force to the motor 802 from the load side.

Still more particularly, in the present embodiment, the command value calculator 207 includes the current sum controller 443 and the current difference controller 444. The current sum controller 443 calculates, by PI control, Vd_s and Vq_s so as to make the d-axis and q-axis current-sum deviations ΔId_s and ΔIq_s approach 0. The current difference controller 444 calculates, by PI control, Vd_d and Vq_d so as to make the d-axis and q-axis current-difference deviations ΔId_d and ΔIq_d approach 0. Moreover, when at least one of the first and second input voltages Vr1 and Vr2 is determined by the input voltage determiner 50 to be outside the normal operation range, the command value calculator 207 reduces the PI gains of both the current sum controller 443 and the current difference controller 444 or the PI gains of only the current difference controller 444 to become less than during normal operation of the motor 802 (see step S73 of FIG. 19).

With the above configuration, it is possible for the command value calculator 207 to reliably lower the responsiveness of the current feedback control to become lower than during normal operation of the motor 802. Moreover, by reducing the PI gains of the current difference controller 444, it is also possible to suppress the adverse effects of the sixth harmonic components as described previously.

While the above particular embodiments have been shown and described, it will be understood by those skilled in the art that various modifications, changes, and improvements may be made without departing from the spirit of the present invention.

(a) in the first and sixth embodiments, when the input voltage Vr is determined by the input voltage determiner 50 to be outside the normal operation range, the ECU 101 shifts control to discontinue the overcurrent abnormality determination by the abnormality determiner 55 (see FIGS. 4 and 16). However, the ECU 101 may be modified to ignore, in any other suitable manner, voltage change (e.g., change in the phase voltages Vu_i, Vv_i and Vw_i outputted from the inverter 60 to the motor 801) or current change (e.g., change in the phase currents Iu, Iv and Iw flowing in the inverter 60 or the phase coils 8-83 of the motor 801) caused by the reverse input of an external force to the motor 801 from the load side.

Moreover, the ECU 101 (or 107) may also be modified to shift control, when the input voltage Vr (or at least one of the first and second input voltages Vr1 and Vr2) is determined by the input voltage determiner 50 to be outside the normal operation range, to suppress control fluctuation, which is caused by the reverse input of an external force to the motor 801 (or 802) from the load side, in any suitable manner other than those described in the second to the fifth and the seventh embodiments.

(b) In the seventh embodiment, the amount of offset between the first three-phase coil set 841 and the second three-phase coil set 842 and the difference in phase between the phase currents Iu1, Iv1 and Iw1 of the first system and the phase currents Iu2, Iv2 and Iw2 of the second system may be generalized to be $(30\pm 60\times n)°$ in electrical angle, where n is an integer (see Japanese Patent No. JP5556845B2).

(c) In the above-described embodiments, the present invention is directed to the three-phase brushless motor 801 (or 802). However, the present invention can also be applied to multi-phase rotating electric machines the number of phases of which is four or more.

Moreover, in the above-described embodiments, the motor 801 (or 802) is employed as a steering assist motor in an electric power steering apparatus of a vehicle. However, the present invention can also be applied to multi-phase rotating electric machines for other uses which may have an external force inputted reversely thereto from the load side.

What is claimed is:

1. A control apparatus that controls drive of a multi-phase rotating electric machine, the rotating electric machine being configured to output torque to a load during normal operation of the rotating electric machine, wherein operation of the rotating electric machine in response to an external force being inputted reversely to the rotating electric machine from the load side is defined as being not normal, the control apparatus comprising:
at least one electric power converter configured to convert, through operation of a plurality of switching elements, DC power into multi-phase AC power and supply the multi-phase AC power to the rotating electric machine;
a command value calculator that calculates command values for operating the at least one electric power converter and thereby controlling energization of the rotating electric machine;
an input voltage determiner that determines whether an input voltage of the at least one electric power converter is higher than an upper limit of a normal operation range, the input voltage being a voltage between a high-potential line and a low-potential line of the at least one electric power converter, the normal operation range being a range of the input voltage during normal operation of the rotating electric machine; and
an abnormality determiner that performs an overcurrent abnormality determination according to whether phase currents flowing in the at least one electric power converter or the rotating electric machine exceed a current threshold, wherein:
the control apparatus is configured to switch control,
in response to the input voltage being determined by the input voltage determiner to be higher than the upper limit of the normal operation range, to bypass voltage change or current change in the at least one electric power converter or the rotating electric machine caused by the reverse input of an external force to the rotating electric machine from the load side or to suppress control fluctuation caused by the reverse input of the external force, and
in response to the input voltage being determined by the input voltage determiner to be outside the normal operation range, the abnormality determiner discontinues the overcurrent abnormality determination.

2. The control apparatus as set forth in claim 1, wherein the control apparatus is further configured to perform, in response to the input voltage being determined by the input voltage determiner to be outside the normal operation range, field-strengthening control to increase positive d-axis current according to RPM of the rotating electric machine.

3. The control apparatus as set forth in claim 1, wherein the rotating electric machine is provided in an electric power steering apparatus of a vehicle to output steering assist torque.

4. The control apparatus as set forth in claim 1, wherein the input voltage determiner has a single input.

5. The control apparatus as set forth in claim 1, wherein in response to the external force being inputted reversely to the rotating electric machine from the load side, the rotating electric machine is driven by the external force to generate a counterelectromotive force, and wherein upon application of the counterelectromotive force to the at least one electric power converter, the input voltage of the at least one electric power converter passively increases to fall outside the normal operation range.

6. The control apparatus as set forth in claim 1, wherein the external force being inputted reversely to the rotating electric machine from the load side is an unexpected external force.

7. A control apparatus that controls drive of a multi-phase rotating electric machine, the rotating electric machine being configured to output torque to a load during normal operation of the rotating electric machine, wherein operation of the rotating electric machine in response to an external force being inputted reversely to the rotating electric machine from the load side is defined as being not normal, the control apparatus comprising:
at least one electric power converter configured to convert, through operation of a plurality of switching elements, DC power into multi-phase AC power and supply the multi-phase AC power to the rotating electric machine;

a command value calculator that calculates command values for operating the at least one electric power converter and thereby controlling energization of the rotating electric machine; and an input voltage determiner that determines whether an input voltage of the at least one electric power converter is higher than an upper limit of a normal operation range, the input voltage being a voltage between a high-potential line and a low-potential line of the at least one electric power converter, the normal operation range being a range of the input voltage during normal operation of the rotating electric machine, wherein:
the control apparatus is configured to switch control, in response to the input voltage being determined by the input voltage determiner to be higher than the upper limit of the normal operation range, to bypass voltage change or current change in the at least one electric power converter or the rotating electric machine caused by the reverse input of an external force to the rotating electric machine from the load side or to suppress control fluctuation caused by the reverse input of the external force, in response to the input voltage being determined by the input voltage determiner to be outside the normal operation range, the command value calculator lowers responsiveness of the drive control of the rotating electric machine to become lower than during normal operation of the rotating electric machine, the command value calculator comprises a current controller that is configured to calculate a voltage command value by PI control so as to make the deviation between a current command value and a current feedback value approach 0, and in response to the input voltage being determined by the input voltage determiner to be outside the normal operation range, the command value calculator reduces proportional and integral gains of the current controller to become less than during normal operation of the rotating electric machine.

8. The control apparatus as set forth in claim 7, wherein the rotating electric machine is provided in an electric power steering apparatus of a vehicle to output steering assist torque.

9. A control apparatus that controls drive of a multi-phase rotating electric machine, the rotating electric machine being configured to output torque to a load during normal operation of the rotating electric machine, wherein operation of the rotating electric machine in response to an external force being inputted reversely to the rotating electric machine from the load side is defined as being not normal, the control apparatus comprising:
at least one electric power converter configured to convert, through operation of a plurality of switching elements, DC power into multi-phase AC power and supply the multi-phase AC power to the rotating electric machine;

a command value calculator that calculates command values for operating the at least one electric power converter and thereby controlling energization of the rotating electric machine; and an input voltage determiner that determines whether an input voltage of the at least one electric power converter is higher than an upper limit of a normal operation range, the input voltage being a voltage between a high-potential line and a low-potential line of the at least one electric power converter, the normal operation range being a range of the input voltage during normal operation of the rotating electric machine, wherein:
the control apparatus is configured to switch control, in response to the input voltage being determined by the input voltage determiner to be higher than the upper limit of the normal operation range, to bypass voltage change or current change in the at least one electric power converter or the rotating electric machine caused by the reverse input of an external force to the rotating electric machine from the load side or to suppress control fluctuation caused by the reverse input of the external force, in response to the input voltage being determined by the input voltage determiner to be outside the normal operation range, the command value calculator lowers responsiveness of the drive control of the rotating electric machine to become lower than during normal operation of the rotating electric machine, the rotating electric machine includes a first three-phase coil set and a second three-phase coil set, the at least one electric power converter comprises a first electric power converter configured to output first alternating current to the first three-phase coil set and a second electric power converter configured to output second alternating current to the second three-phase coil set, the first alternating current and the second alternating current being different in phase from each other by $(30\pm60\times n°)$ in electrical angle, where n is an integer, the input voltage of the at least one electric power converter comprises a first input voltage and a second input voltage, the first input voltage being a voltage between a high-potential line and a low-potential line of the first electric power converter, the second input voltage being a voltage between a high-potential line and a low-potential line of the second electric power converter, the command value calculator comprises:
a current sum controller that calculates, by PI control, a sum of a first voltage command value for the first electric power converter and a second voltage command value for the second electric power converter so as to make a current-sum deviation approach 0, the current-sum deviation being a deviation between a sum of first and second current command values and a sum of first and second current feedback values, the first and second current command values being respectively a command value for the first alternating current and a command value for the second alternating current, the first and second current feedback values being respectively a feedback value of the first alternating current and a feedback value of the second alternating current; and a current difference controller that calculates, by PI control, a difference between the first and second voltage command values so as to make a current-difference deviation approach 0, the current-difference deviation being a deviation between a difference between the first and second current command values and a difference between the first and second current feedback values, and in response to at least one of the first and second input voltages being determined by the input voltage determiner to be outside the normal operation range, the command value calculator reduces proportional and integral gains of both the current sum controller and the current difference controller or the proportional and integral gains of only the current difference controller to become less than during normal operation of the rotating electric machine.

10. The control apparatus as set forth in claim 9, wherein the rotating electric machine is provided in an electric power steering apparatus of a vehicle to output steering assist torque.

11. A control apparatus that controls drive of a multi-phase rotating electric machine, the rotating electric machine being configured to output torque to a load during normal operation of the rotating electric machine, wherein operation of the rotating electric machine in response to an external force being inputted reversely to the rotating electric machine from the load side is defined as being not normal, the control apparatus comprising:
at least one electric power converter configured to convert, through operation of a plurality of switching elements, DC power into multi-phase AC power and supply the multi-phase AC power to the rotating electric machine;
a command value calculator that calculates command values for operating the at least one electric power converter and thereby controlling energization of the rotating electric machine; and
an input voltage determiner that determines whether an input voltage of the at least one electric power converter is higher than an upper limit of a normal operation range, the input voltage being a voltage between a high-potential line and a low-potential line of the at least one electric power converter, the normal operation range being a range of the input voltage during normal operation of the rotating electric machine, wherein:
the control apparatus is configured to switch control, in response to the input voltage being determined by the input voltage determiner to be higher than the upper limit of the normal operation range, to bypass voltage change or current change in the at least one electric power converter or the rotating electric machine caused by the reverse input of an external force to the rotating electric machine from the load side or to suppress control fluctuation caused by the reverse input of the external force,
in response to the input voltage being determined by the input voltage determiner to be outside the normal operation range, the command value calculator lowers responsiveness of the drive control of the rotating electric machine to become lower than during normal operation of the rotating electric machine, and
the control apparatus is further configured to perform, in response to the input voltage being determined by the input voltage determiner to be outside the normal operation range, field-strengthening control to increase positive d-axis current according to RPM of the rotating electric machine.

12. The control apparatus as set forth in claim 11, wherein the rotating electric machine is provided in an electric power steering apparatus of a vehicle to output steering assist torque.

13. A control apparatus that controls drive of a multi-phase rotating electric machine, the rotating electric machine being configured to output torque to a load during normal operation of the rotating electric machine, wherein operation of the rotating electric machine in response to an external force being inputted reversely to the rotating electric machine from the load side is defined as being not normal, the control apparatus comprising:
at least one electric power converter configured to convert, through operation of a plurality of switching elements, DC power into multi-phase AC power and supply the multi-phase AC power to the rotating electric machine;
a command value calculator that calculates command values for operating the at least one electric power converter and thereby controlling energization of the rotating electric machine; and
an input voltage determiner that determines whether an input voltage of the at least one electric power converter is higher than an upper limit of a normal operation range, the input voltage being a voltage between a high-potential line and a low-potential line of the at least one electric power converter, the normal operation range being a range of the input voltage during normal operation of the rotating electric machine, wherein:
the control apparatus is configured to switch control, in response to the input voltage being determined by the input voltage determiner to be higher than the upper limit of the normal operation range, to bypass voltage change or current change in the at least one electric power converter or the rotating electric machine caused by the reverse input of an external force to the rotating electric machine from the load side or to suppress control fluctuation caused by the reverse input of the external force,
the command value calculator comprises a guard value setter that sets a guard value and a command value limiter that limits the absolute value of one of a current command value and a voltage command value to be less than or equal to the absolute value of the guard value set by the guard value setter, and
in response to the input voltage being determined by the input voltage determiner to be outside the normal operation range, the guard value setter changes the guard value to become closer to 0 than during normal operation of the rotating electric machine.

14. The control apparatus as set forth in claim 13, wherein the control apparatus is further configured to perform, in response to the input voltage being determined by the input voltage determiner to be outside the normal operation range, field-strengthening control to increase positive d-axis current according to RPM of the rotating electric machine.

15. The control apparatus as set forth in claim 13, wherein the rotating electric machine is provided in an electric power steering apparatus of a vehicle to output steering assist torque.

16. A control apparatus that controls drive of a multi-phase rotating electric machine, the rotating electric machine being configured to output torque to a load during normal operation of the rotating electric machine, wherein operation of the rotating electric machine in response to an external force being inputted reversely to the rotating electric machine from the load side is defined as being not normal, the control apparatus comprising:

at least one electric power converter configured to convert, through operation of a plurality of switching elements, DC power into multi-phase AC power and supply the multi-phase AC power to the rotating electric machine;

a command value calculator that calculates command values for operating the at least one electric power converter and thereby controlling energization of the rotating electric machine; and an input voltage determiner that determines whether an input voltage of the at least one electric power converter is higher than an upper limit of a normal operation range, the input voltage being a voltage between a high-potential line and a low-potential line of the at least one electric power converter, the normal operation range being a range of the input voltage during normal operation of the rotating electric machine, wherein:

the control apparatus is configured to switch control, in response to the input voltage being determined by the input voltage determiner to be higher than the upper limit of the normal operation range, to bypass voltage change or current change in the at least one electric power converter or the rotating electric machine caused by the reverse input of an external force to the rotating electric machine from the load side or to suppress control fluctuation caused by the reverse input of the external force, the command value calculator comprises a command value holder that stores and holds therein a voltage command value or current command value during normal operation of the rotating electric machine, and in response to the input voltage being determined by the input voltage determiner to be outside the normal operation range, the command value calculator uses, for the operation of the at least one electric power converter, the voltage command value or current command value held in the command value holder.

17. The control apparatus as set forth in claim 16, wherein the control apparatus is further configured to perform, in response to the input voltage being determined by the input voltage determiner to be outside the normal operation range, field-strengthening control to increase positive d-axis current according to RPM of the rotating electric machine.

18. The control apparatus as set forth in claim 16, wherein the rotating electric machine is provided in an electric power steering apparatus of a vehicle to output steering assist torque.

* * * * *